United States Patent
Yamaguchi

(10) Patent No.: US 8,517,822 B2
(45) Date of Patent: Aug. 27, 2013

(54) GAME SYSTEM, CONTROL METHOD OF GAME SYSTEM, AND RECORDING MEDIUM

(75) Inventor: Tsuyoshi Yamaguchi, Sakai (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/136,802

(22) Filed: Aug. 11, 2011

(65) Prior Publication Data

US 2012/0046093 A1 Feb. 23, 2012

(30) Foreign Application Priority Data

Aug. 18, 2010 (JP) .................................. 2010-183376

(51) Int. Cl.
*A63F 13/00* (2006.01)

(52) U.S. Cl.
USPC ..................................... 463/23; 463/4; 463/40

(58) Field of Classification Search
USPC ........................................ 463/4, 9, 23, 40, 42
See application file for complete search history.

(56) References Cited

U.S. PATENT DOCUMENTS

| | | | |
|---|---|---|---|
| 2001/0034267 A1* | 10/2001 | Toyama et al. | 463/31 |
| 2002/0107059 A1* | 8/2002 | Katayama | 463/4 |
| 2004/0242294 A1* | 12/2004 | Shiozawa | 463/9 |
| 2004/0248653 A1* | 12/2004 | Barros et al. | 463/43 |
| 2005/0130725 A1* | 6/2005 | Creamer et al. | 463/1 |
| 2006/0205462 A1* | 9/2006 | Bentz et al. | 463/2 |
| 2007/0021167 A1* | 1/2007 | Ma et al. | 463/4 |
| 2007/0265043 A1* | 11/2007 | Wang et al. | 463/2 |
| 2008/0280685 A1* | 11/2008 | Hansen et al. | 463/42 |
| 2008/0287196 A1* | 11/2008 | Miki et al. | 463/42 |

FOREIGN PATENT DOCUMENTS

| | | |
|---|---|---|
| JP | 2002-273034 | 9/2002 |
| JP | 2004-261217 | 9/2004 |

* cited by examiner

*Primary Examiner* — Arthur O. Hall
*Assistant Examiner* — Allen Chan
(74) *Attorney, Agent, or Firm* — Jordan and Hamburg LLP

(57) ABSTRACT

A game server of a game system includes: a player existence determination unit for determining whether a player exists in a predetermined area (ballpark or the like) of a real world during a predetermined time span; a strength improvement information generation unit for generating strength improvement information which improves the strength of the player when the versus game is to be performed in the in-game match-up area (in-game ballpark) corresponding to the predetermined area when the player existence determination unit determines that the player exists in the predetermined area during the predetermined time span; and a distribution unit for distributing the strength improvement information generated by the strength improvement information generation unit to the terminal device of the player.

9 Claims, 16 Drawing Sheets

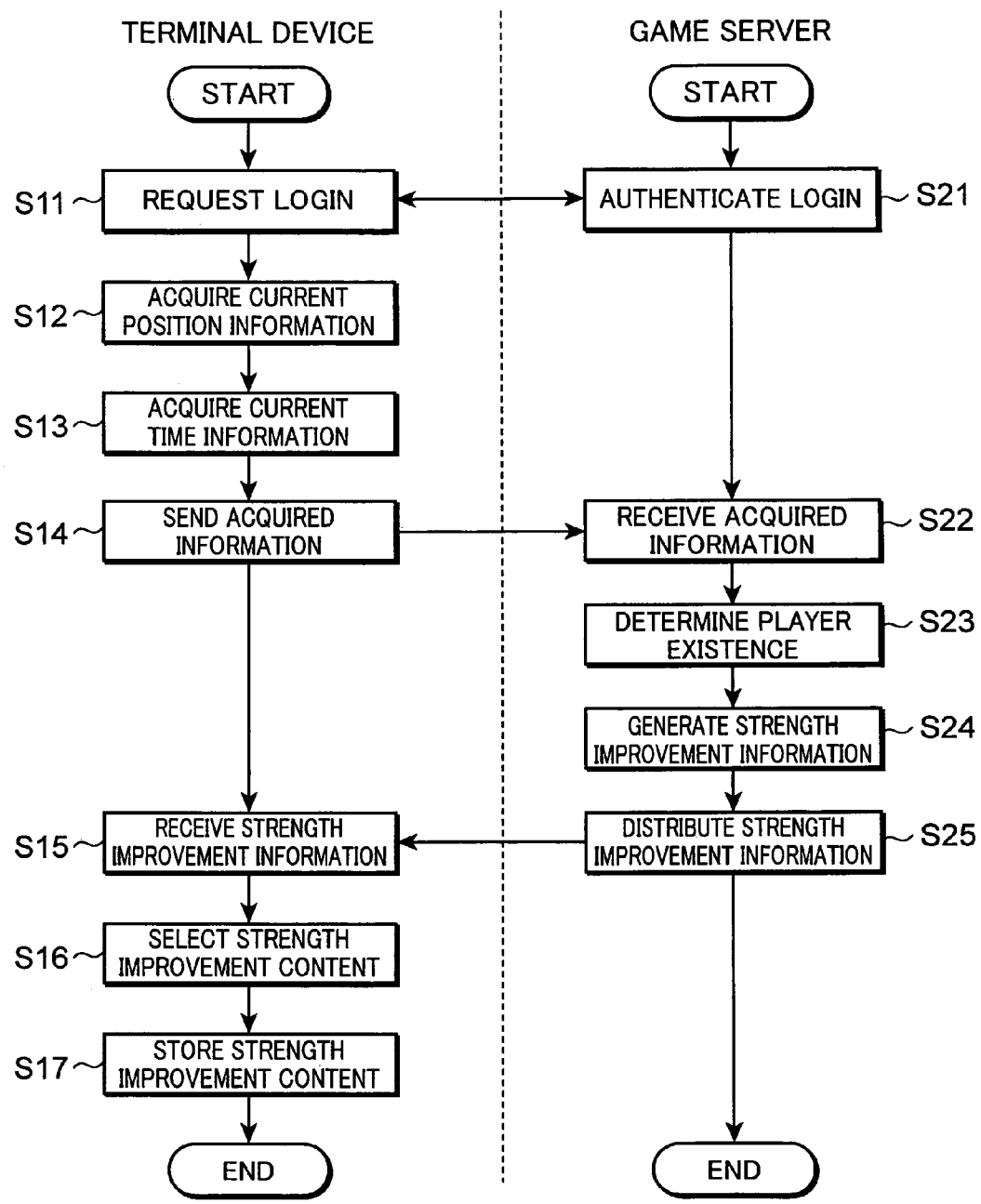

GAME SYSTEM, CONTROL METHOD OF GAME SYSTEM, AND RECORDING MEDIUM

BACKGROUND OF THE INVENTION

1. Field of the Invention

The present invention relates to a game system for causing a computer to realize a game where a player operates a character displayed on a screen, a method of controlling such a game system, and a recording medium.

2. Description of the Related Art

In recent years, game systems that realize games that are played among a plurality of players via the interne or games where a sole player plays a game with the computer as his/her opponent. Moreover, there are those which acquire the current position information by receiving signals from a GPS (Global Positioning System) satellite and using it in a game (for example, JP2002-273034 and JP2004-261217).

As this kind of game, there are various games including baseball, soccer, martial arts, car racing and so on. With this kind of game, normally, a player advances the game by operating the character displayed on a screen of a game machine (or a personal computer or the like). Among these games, certain games allow the player to improve one's own strength in the versus game upon achieving certain positive results in the versus game such as winning a match against the opponent. Consequently, the amusement of the game is increased by enabling the strength in the versus game to be improved.

Nevertheless, with a conventional game system, the only time that the strength can be improved is when the player operates the character and achieves certain positive results in the versus game. In other words, the improvement of strength in the versus game was dependent only on the player's skills of character operation, amount of operation, or operation hours, and a new development is desired with respect to this point.

SUMMARY OF THE INVENTION

The present invention was devised in view of the foregoing problems, and its object is to provide a game system, a control method of the game system, and a recording medium for realizing a game with greater amusement by further enhancing the game element of improving the strength in a versus game.

The game system according to one aspect of the present invention is a game system configured from a terminal device for a player to perform a versus game by operating a character in an in-game match-up area displayed on a screen by an image display unit, and a management unit communicably connected to the terminal device, wherein the management unit comprises a player existence determination unit for determining whether the player exists in a predetermined area of a real world corresponding to the in-game match-up area during a predetermined time span, a strength improvement information generation unit for generating strength improvement information which improves the strength of the player when the versus game is to be performed in the in-game match-up area corresponding to the predetermined area when the player existence determination unit determines that the player exists in the predetermined area during the predetermined time span, and a distribution unit for distributing the strength improvement information generated by the strength improvement information generation unit to the terminal device of the player or a communication device capable of transferring the strength improvement information to the terminal device, and wherein the terminal device comprises a strength improvement unit for improving the strength based on the strength improvement information when the player is to play the versus game in the in-game match-up area.

The method of controlling a game system according to another aspect of the present invention is a method of controlling a game system configured from a terminal device for a player to perform a versus game by operating a character in an in-game match-up area displayed on a screen, and a management unit which is communicably connected to the terminal device, this method comprising a player existence determination step in which the management unit determines whether the player exists in a predetermined area of a real world corresponding to the in-game match-up area during a predetermined time span, a strength improvement information generation step in which the management unit generates strength improvement information which improves the strength of the player when the versus game is to be performed in the in-game match-up area corresponding to the predetermined area when the player existence determination step determines that the player exists in the predetermined area during the predetermined time span, a distribution step in which the management unit distributes the strength improvement information generated in the strength improvement information generation step to the terminal device of the player or a communication device capable of transferring the strength improvement information to the terminal device, and a strength improvement step in which the terminal device improves the strength based on the strength improvement information when the player is to play the versus game in the in-game match-up area.

A computer-readable recording medium according to yet another aspect of the present invention is a computer-readable recording medium recorded with a program for causing a computer included in a game system configured from a terminal device for a player to perform a versus game by operating a character in an in-game match-up area displayed on a screen, and a management unit which is communicably connected to the terminal device to execute a player existence determination function of causing the management unit to determine whether the player exists in a predetermined area of a real world corresponding to the in-game match-up area during a predetermined time span, a strength improvement information generation function of causing the management unit to generate strength improvement information which improves the strength of the player when the versus game is to be performed in the in-game match-up area corresponding to the predetermined area when the player existence determination function determines that the player exists in the predetermined area during the predetermined time span, a distribution function of causing the management unit to distribute the strength improvement information generated by the strength improvement information generation function to the terminal device of the player or a communication device capable of transferring the strength improvement information to the terminal device, and a strength improvement function of causing the terminal device to improve the strength based on the strength improvement information when the player is to play the versus game in the in-game match-up area.

BRIEF DESCRIPTION OF THE DRAWINGS

FIG. 9 is a flowchart showing the main operation of the game system according to an embodiment of the present invention;

Figure 1:
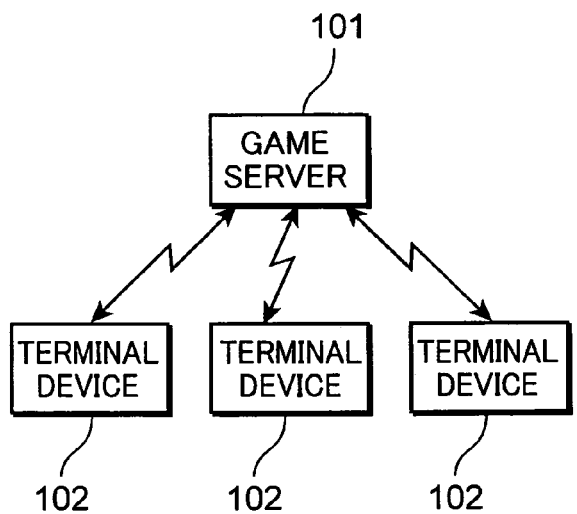
FIG. 1 is an explanatory diagram showing the overall configuration of the game system according to an embodiment of the present invention.

DESCRIPTION OF THE PREFERRED
EMBODIMENTS

The invention is now described, by way of example, with reference to the accompanying drawings.

This application is based on Japanese Patent Application Serial No. 2010-183376 filed in Japan Patent Office on Aug. 18, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The game system according to an embodiment of the present invention is now explained with reference to the appended drawings.

[Outline of Network Game System]

This game system is used by a player to execute a game by operating a character displayed on a screen, and can improve the strength in a versus game. This game element of improving the strength is an extremely important element in order to improve the game amusement, and if this game element can be further enhanced than conventionally, it is possible to realize a game system with even greater amusement. Thus, this game system enables the game element of being able to improve the strength, which was conventionally dependent only on the game player's skills of character operation, amount of operation, or operation hours, by the game player visiting a predetermined area in the real world. For example, if it is a sports game, the game player is given the opportunity to improve one's strength in the game by visiting a sports arena (ballpark in the case of a baseball game) in the real world.

In other words, with this game system, if the game player visits a predetermined area in the real world during a predetermined time span (for instance, visits a ball park during the time span that the ballgame is being played in the real world), the game player is given the opportunity to improve one's strength in the game based on the foregoing fact.

With this game system, the predetermined area in the real world and the in-game match-up area are linked. If the game player visits a predetermined area in the real world during a predetermined time span and the player thereafter plays a versus game in an in-game match-up area corresponding to the predetermined area in the real world, that player can improve one's strength to be greater than prior to visiting the predetermined area in the real world, and thereby improve one's winning percentage.

There are various types of games that can be realized with this game system, but in this embodiment, a baseball game is taken as an example in the ensuing explanation. A baseball game is a game of competing for points by applying the rules of a standard baseball game. For example, when a first team selected by the player A operating the terminal A of the game system and a second team selected by the player B of the terminal device B are to play a ballgame, a pitcher character operated by the player A pitches a ball object and a batter character operated by the player B hits the pitched ball object. Moreover, a fielder character operated by the player A fields and throws the hit ball object and a runner character operated by the player B runs the bases. With this kind of baseball game, the player A and the player B compete for points by switching offense and defense according to the rules of a standard baseball game. Note that one player can also execute the baseball game based on the automatic control by a CPU based on an AI program (Artificial Intelligence Program).

As an example of one's strength improvement in the game, there is the improvement of the capability of the character that is operated by the player. In particular, in a versus game where teams composed of a plurality of characters such as with a baseball game, the strength can be improved by improving the character capability of all or certain characters configuring the team, or adding a special character having predetermined high capability to the team.

As examples of the character capability in a baseball game in relation to the character performance that can realize the improvement in strength, there are ball speed, ball control, stamina and the like which represent a pitcher's capabilities if the character is a pitcher, and hitting power, running speed, defense ability and the like which represent a fielder's capabilities if the character is a fielder. Note that the all or a part of the character capability, which is further segmentalized; for example, subdivision of the control of a fastball and the control of a breaking ball with respect to control, and long drives and contact hitting with respect to hitting power, can be increased for strength improvement.

The configuration of the game system is now explained in detail.

[Overall Configuration of Game System]

FIG. 1 is a diagram showing the overall configuration of the game system 100. The game system 100 comprises a game server 101 (management unit), and a terminal device 102 which is communicably connected to the game server 101.

The player plays the game by operating the character displayed on a screen by the image display unit (described later) of the terminal device 102. The terminal device 102 that is operated by the player is configured from a known domestic game machine, a portable game machine, a portable information terminal, a mobile phone, a personal computer or the like.

In the game system 100, a terminal ID for uniquely identifying the respective terminal devices 102 is given to each terminal device 102. In addition, a player ID for uniquely identifying the respective players is given to each player operating the respective terminal devices 102. The game server 101 manages the information concerning the respective terminal devices 102 and the respective players by associating the foregoing identification information (terminal ID and player ID) and sending and receiving data to and from the respective terminal devices 102.

The game server 101 and the terminal device 102 are connected in a mutually communicable manner based on one or a combination of communication paths such as a mobile communication line, a public line, a dedicated line, a LAN, internet, and the like.

The configuration of the game server 101 and the terminal device 102 in the game system 100 is now explained in detail.

[Configuration of Respective Devices in Game System]

Figure 3:
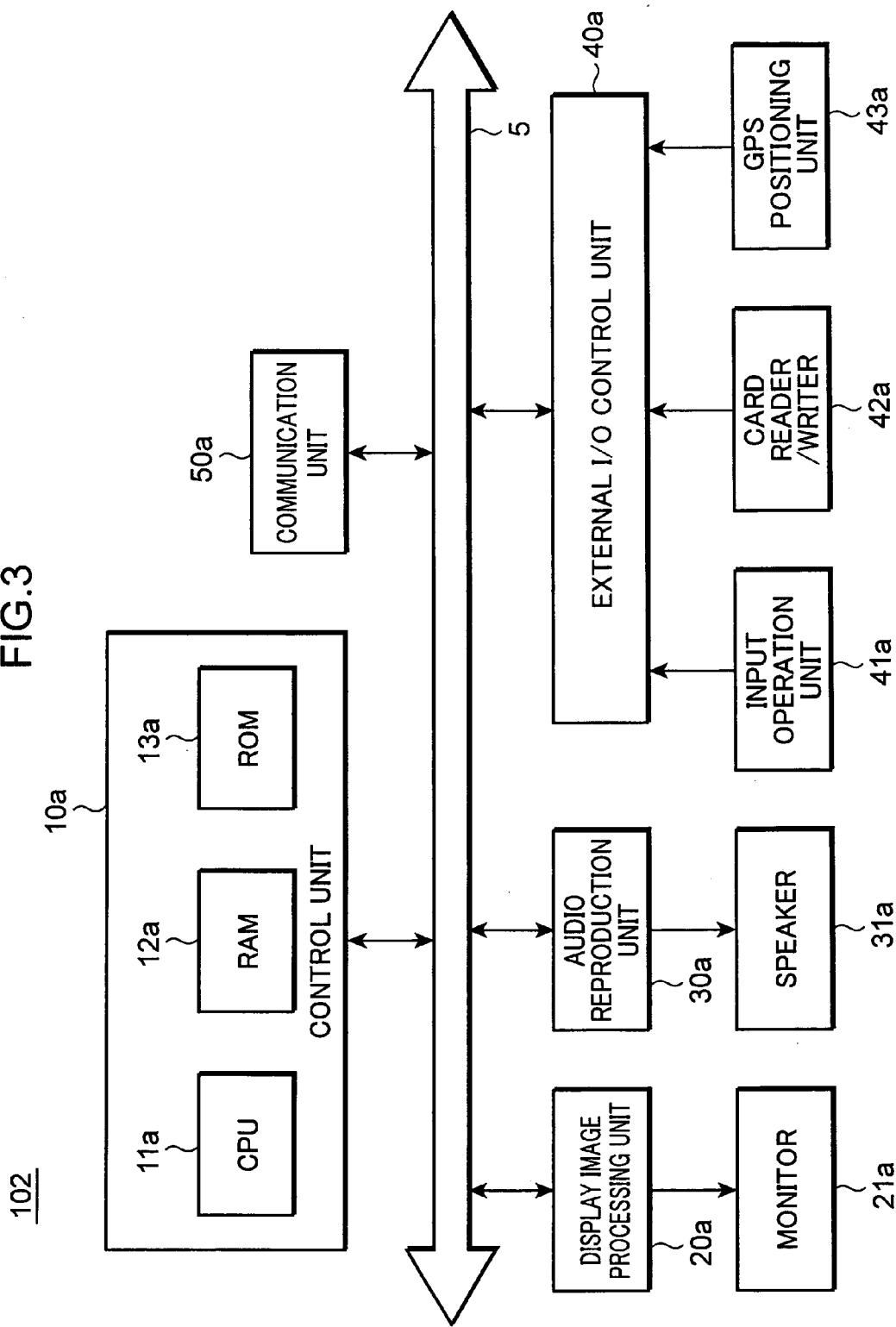
FIG. 3 is a block diagram showing the hardware configuration of the terminal device configuring the game system according to an embodiment of the present invention.

As shown in FIG. 3, the terminal device 102 comprises a control unit 10a, a display image processing unit 20a, an audio reproduction unit 30a, an external I/O control unit 40a and a communication unit 50a, and these components are mutually connected via a bus 5.

As shown in FIG. 3, the control unit 10a is used for controlling the operation of the overall terminal device 102, and comprises an information processing unit (CPU) 11a for performing processing concerning the overall game progress, image display processing and various other types of information processing, a RAM (Random Access Memory) 12a for temporarily storing information and the like which are being processed, and a ROM 13a which preliminarily stores various programs and the like, and these components are mutually connected via a bus 5.

The ROM 13a stores program data of the operating system (OS), and game data configured from image data, audio data and various program data. As the image data stored in the ROM 13a, there are data of player characters (pitcher character, batter character, fielder character, runner character), background image, images of various operation screens and setting screen, and so on. Moreover, the image data of player characters and the like are configured with the required number of polygons configuring the same so as to enable three-dimensional rendering.

The CPU 11a reads the image data, audio data, control program data, game program data and the like from the ROM 13a based on the operating system that is recorded on the built-in or detachable ROM 13a. A part or all of the read data is retained in the RAM 12a. Subsequently, the CPU 11a performs various types of data processing based on the control programs and various data (image data and audio data and the like including polygons and textures of the display object and other character images) which are stored in the RAM 12a.

As the foregoing data processing, included are the calculation processing in a three-dimensional space, the position conversion calculation processing from the three-dimensional space to a simulated three-dimensional space, the light source calculation processing, and generation/creation processing of images and audio data.

Data that can be stored in a removable recording medium among the various types of data stored in the ROM 13a can also be read, for example, with various drive units such as a hard disk drive, optical disk drive, flexible disk drive, cassette medium-readable machine and so on. In the foregoing case, as the recording medium, used may be, for example, a hard disk, optical disk (CD-ROM, DVD-ROM, UMD or the like), flexible disk, semiconductor memory, ROM cassette, cartridge of a domestic video game device, and the like.

The display image processing unit 20a comprises an interface circuit and a D/A converter (Digital-To-Analog converter) and the like, and displays, according to the image display command from the CPU 11a, the image data written into the RAM 12a and the image data read from the ROM 13a on a monitor 21a such as a liquid crystal display.

The audio reproduction unit 30a generates a voice message, sound effect, song data and the like to be generated during the game progress according to a command from the CPU 11a, and outputs this to a speaker 31a.

The external I/O control unit 40a includes an interface circuit and the like, and controls the input and output of data between the control unit 10a and the input operation unit 41a, or between the control unit 10a and the card reader/writer 42a, or between the control unit 10a and the GPS positioning unit 43a described later. For example, the external I/O control unit 40a converts the operation detection signal that is input from the input operation unit 41a into a digital signal that can be processed by the control unit 10a. The input operation unit 41a is configured from a keyboard, mouse, controller and buttons for a domestic video game, imaging device (camera) for inputting image information and the like for the player to input the various operational commands.

The communication unit 50a comprises a communication information interface circuit, a communication modem and the like, and is used for sending and receiving various types of data to and from the game server 101, and to and from another terminal device 102 of the opponent via a communication path such as the internet.

Figure 2:
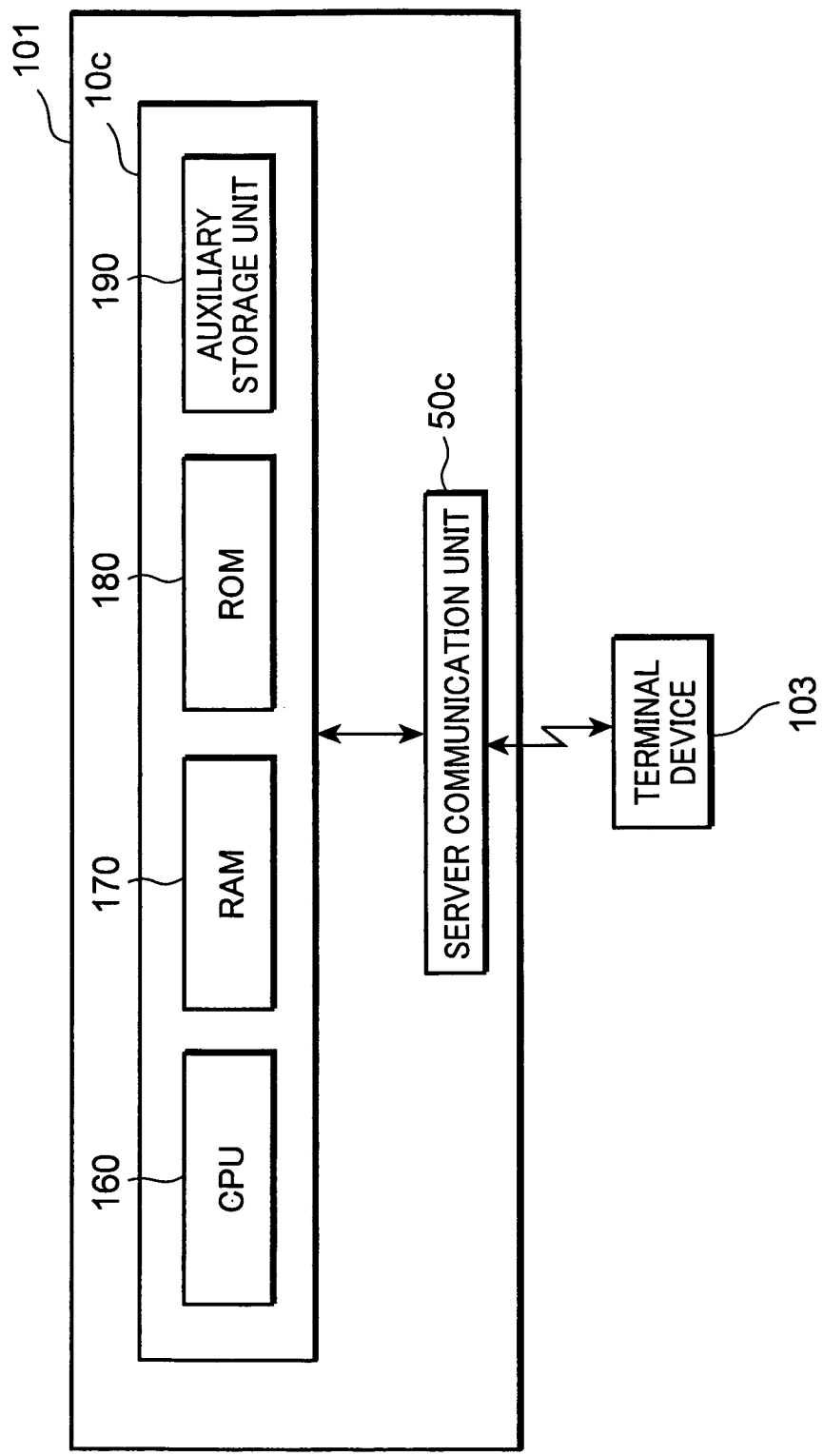
FIG. 2 is a block diagram showing the hardware configuration of the game server configuring the game system according to an embodiment of the present invention.

The configuration of the game server 101 is now explained. As shown in FIG. 2, the game server 101 is a computer comprising a server control unit 10c and a server communication unit 50c.

The server control unit 10c controls the operation of the overall game server 101, and comprises an information processing unit (CPU) 160, a RAM 170 for temporarily storing information and the like which are being processed, a ROM 180 which preliminarily stores prescribed programs and the like, and an auxiliary storage unit 190 such as a hard disk device or an optical disk device. The operating system (OS), various programs, and various setup data stored in the ROM 180 or the auxiliary storage unit 190 are loaded in the RAM 170, and the various functions of the game server 101 are realized by the CPU 160 sequentially executing the programs in the RAM 170.

The server communication unit 50c comprises a communication information interface circuit, a communication modem and the like, and sends and receives various types of data to and from the respective terminal devices 102 via a communication line such as the internet.

Figure 4:
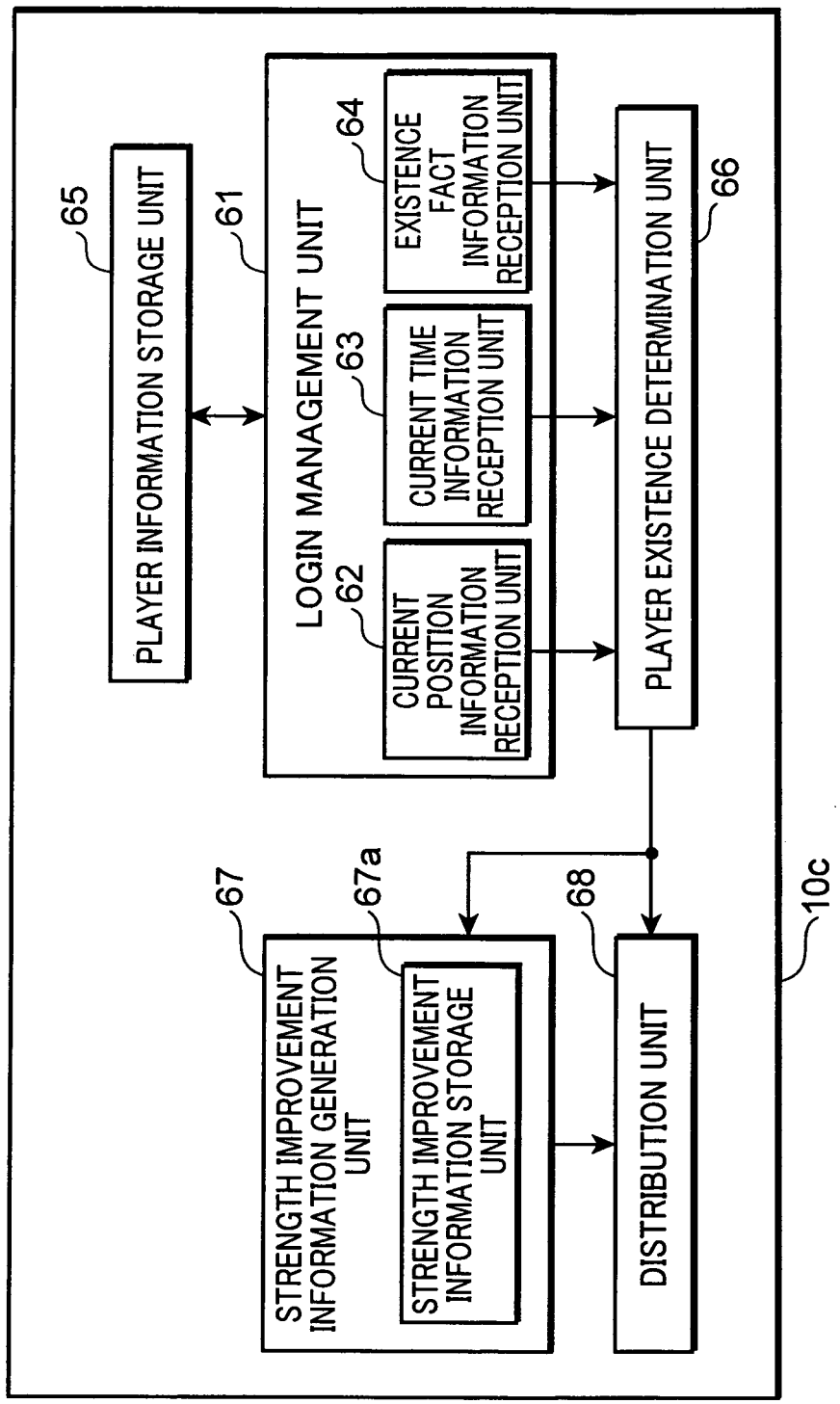
FIG. 4 is a functional block diagram of the control unit of the game server according to an embodiment of the present invention.
Figure 5:
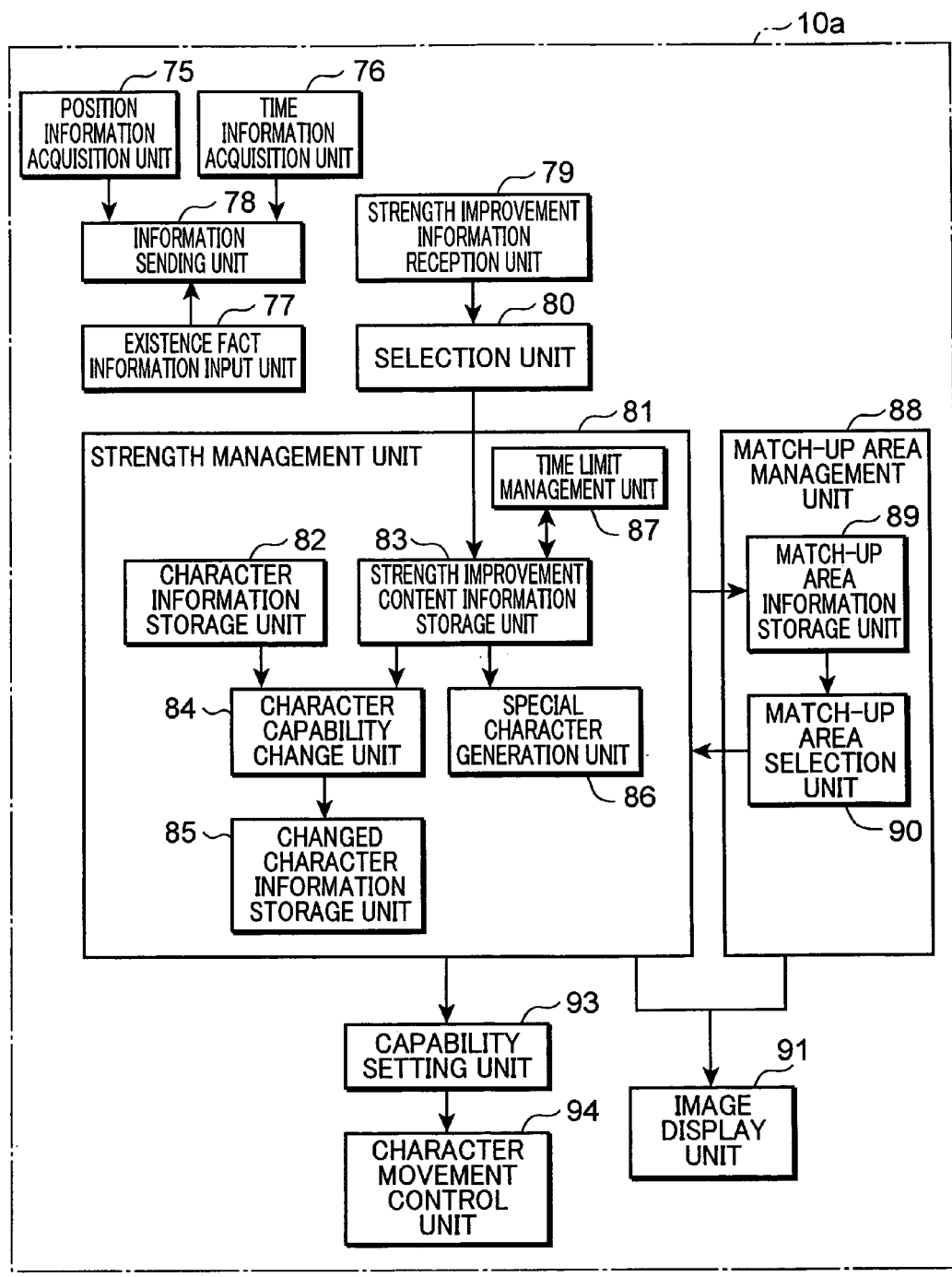
FIG. 5 is a functional block diagram of the control unit of the terminal device configuring the game system according to an embodiment of the present invention.

The functional configuration of the game server 101 and the terminal device 102 is now explained. FIG. 4 is a functional block diagram of the server control unit 10c in the game server 101. FIG. 5 is a functional block diagram of the control unit 10*a* in the terminal device 102.

Foremost, the main functions of the game server 101 are explained. The game server 101 comprises a login authentication function, a player existence determination function, a strength improvement information generation function, a strength improvement information distribution function, and the like.

The login authentication function is the function of performing login authentication of determining the access authorization of the respective users upon the respective users operating the respective terminal devices 102 and attempting to the log into the game server 101. For example, in the case of a game based on a membership online service, the membership qualification is authenticated.

The player existence determination function is a function of determining whether the player exists in a ballpark (predetermined area) during a time span (predetermined time span) when a ballgame is being played in the real world. This function is realized based on the communication between the terminal device 102, which the player carried to the ballpark in the real world, and the game server 101. Details regarding this function will be described later.

The strength improvement information generation function is a function of generating strength improvement information for improving the strength upon playing a versus game in an in-game match-up area (in-game ballpark) corresponding to the predetermined area (ballpark in the case of a baseball game) in the real world where the player had actually visited.

The strength improvement information distribution function is a function of distributing the strength improvement information generated by the strength improvement information generation function to the player's terminal device 102. Details concerning the configuration of realizing these functions will be described later.

Moreover, as other functions, the game server 101 may also comprise a matching function, match-up management function, capability evaluation level (virtual rank, reward, frame, class or the like) management function, and so on. The matching function is a function of deciding the combination of opponents among a match-up request terminal group configured from a plurality of terminal devices 102 that are requesting a match via the interne. The match-up management function is a function of confirming the communication status of the respective terminal devices 102 until the versus game is over when such a versus game is being played among a plurality of terminal devices 102, and managing whether the match is still being continued. The capability evaluation level management function is a function of deciding the capability evaluation level (virtual rank, reward, frame, class or the like) to be given to the respective players as a result of cumulatively evaluating the game results of the respective players up to such point in time, and managing the capability evaluation level by associating it with the identification information (terminal ID and player ID) of the respective terminal devices 102. Moreover, the game server 101 may also include a function of calculating the world ranking, national ranking or special regional ranking based on the capability evaluation level of the respective players.

Note that, since the foregoing login authentication function, player existence determination function, attribute change information generation function, attribute change information distribution function, matching function, match-up management function, capability evaluation level management function and the like may be realized anywhere in the game system 100, they do not necessarily have to be realized in a single game server 101. For example, a part of these functions can be separated and realized with a plurality of functionally-distributed servers. In this embodiment, for the sake of convenience, a configuration example is explained where these function are all provided in the game server 101, and collectively managed by the game server 101.

As shown in FIG. 4, the server control unit 10*c* of the game server 101 comprise a login management unit 61, a player information storage unit 65, a player existence determination unit 66, a strength improvement information generation unit 67, and a distribution unit 68.

The login management unit 61 receives the identification information (the terminal ID and personal information such as the player ID) of the respective terminal devices 102 when the respective players operate the respective terminal devices 102 and attempt to log into the game server 101. Subsequently, the login management unit 61 verifies the terminal ID and player ID based on the player information stored in the player information storage unit 65 so as to accept the login of the respective players, and thereby realizes the login authentication function.

Moreover, the login management unit 61 comprises a current position information reception unit 62, a current time information reception unit 63 and an existence fact information reception unit 64. The current position information reception unit 62 receives the current position information that was sent from the terminal device 102 after the foregoing login authentication, and outputs the current position information to the player existence determination unit 66. The current time information reception unit 63 receives the current time information that was sent from the terminal device 102 after the foregoing login authentication, and outputs the current time information to the player existence determination unit 66. The existence fact information reception unit 64 receives the existence fact information that was sent from the terminal device 102 after the foregoing login authentication, and outputs the existence fact information to the player existence determination unit 66.

Here, the current position information is information showing the current position (latitude and longitude) of the player's terminal device 102. Moreover, the current time information is information showing the time that the player's terminal device 102 acquired the current position information. Based on the current position information and the current time information, it is possible to recognize the place and time that the player carrying the terminal device 102 actually existed in the predetermined area.

Moreover, the existence fact information is information showing the fact that the player carrying the terminal device 102 existed in the ballpark (predetermined area) during the time span (predetermined time span) that the ballgame was being played in the real world. As specific examples, there are image information, barcode information, or character/number/symbol information such as a keyword or password that cannot be imaged, acquired or confirmed unless the player visits the ballpark during the time span that the ballgame is being played in the real world.

Note that, in this embodiment, although the game server 101 is illustrated as having a configuration of comprising all of the current position information reception unit 62, the current time information reception unit 63 and the existence fact information reception unit 64, the configuration may also be such that only the current position information reception unit 62 and the current time information reception unit 63 are provided, or the configuration may be such that only the existence fact information reception unit 64 is provided.

The player existence determination unit 66 determines whether the player carrying the terminal device 102 exists in a predetermined ballpark during a time span where the ballgame is being playing in the real world based on the foregoing current position information and the current time information. In other words, the player existence determination unit 66 preliminarily stores the ballgame time span information and the ballpark area information of the ballgame that is being played in the real world in a predetermined storage area, and, by comparing the ballgame time span information and the ballpark area information, and the current position information and the current time information received from the terminal device 102, determines whether the player exists in the ballpark during the time span that the ballgame is being played in the real world. Note that the foregoing ballgame time span information and ballpark area information are input into the game server 101 and stored in a predetermined storage area after the season schedule of baseball in the real world is decided and before the start of the actual ballgame.

For example, in a baseball game having 12 in-game match-up areas (in-game ballparks in the virtual space) which are linked with the home fields of the 12 baseball clubs in Japanese professional baseball, the ballgame time span information and ballpark area information of baseball games in the real world to be played in the home fields of the 12 baseball clubs are input into the game server 101 and stored in a predetermined storage area. Moreover, in a baseball game having 30 in-game match-up areas which are linked with the home fields of the 30 baseball clubs in the Major leagues, similarly, the ballgame time span information and ballpark area information of baseball games in the real world to be played in the home fields of the 30 baseball clubs are input and stored in the game server 101.

The player existence determination unit 66 of this embodiment can determine that the player exists in the ballpark during the ballgame time span if it is possible to confirm that the player carrying the terminal device 102 existed in the predetermined ballpark at one point that is included in the time span when the ballgame is being played in the real world. In the foregoing case, if the terminal device 102 once logs into the game server 101 and once sends the current position information and the current time information to the game server 101, the player existence determination unit 66 can determine that the player exists in the ballpark during the ballgame time span.

Note that, as a variation to the determination conditions of the player existence determination unit 66, it is also possible to determine that the player exists in the ballpark during the ballgame time span on the condition that the player exists in the ballpark from the start of the ballgame in the real world (or within a predetermined time after the start of the ballgame) to the end of the ballgame. In the foregoing case, the player existence determination unit 66 can determine that the player exists in the ballpark during the ballgame time span (until the end of the ballgame) as a result of the terminal device 102 continuing the login state until the end of the ballgame after logging into the game server 101, and periodically sending the current position information and the current time information to the game server 101. Otherwise, the player existence determination unit 66 can determine that the player exists in the ballpark during the ballgame time span (until the end of the ballgame) as a result of the terminal device 102 logging into the game server 101 at the start of the ballgame (or within a predetermined time after the start of the ballgame) (or within a predetermined time after the start of the ballgame), sending the current position information and the current time information to the game server 101, thereafter once logging off, and once again logging into the game server 101 after the ballgame has ended (or within a predetermined time after the end of the ballgame) and sending the current position information and the current time information to the game server 101.

Moreover, the player existence determination unit 66 determines whether the player carrying the terminal device 102 exists in the ballpark during the time span that the ballgame is being played in the real world based on the existence fact information (image information, barcode information, or character/number/symbol information). In other words, the player existence determination unit 66 preliminarily stores the existence fact information for each ballgame that is being played in the real world in a predetermined storage area, and, by comparing the preliminarily stored existence fact information and the existence fact information received from the terminal device 102, determines whether the player exists in the ballpark during the time span that the ballgame is being played in the real world. Note that the foregoing existence fact information of each ballgame is input into the game server 101 and stored in a predetermined storage area after the season schedule of baseball in the real world is decided and before the start of the actual ballgame.

When the player existence determination unit 66 determines that the player exists in the predetermined ballpark during the time span that the ballgame is being played in the real world, it outputs such determination result to the strength improvement information generation unit 67 and the distribution unit 68. Moreover, the player existence determination unit 66 also outputs, to the distribution unit 68, information of the player's terminal device 102 as the distribution destination.

When the player existence determination unit 66 determines that the player exists in the predetermined ballpark during the time span that the ballgame is being played in the real world, the strength improvement information generation unit 67 generates strength improvement information for improving the strength upon playing a versus game in an in-game match-up area (in-game ballpark) corresponding to the ballpark. Thus, the strength improvement information contains information (ballpark ID) for identifying the ballpark to which the player had visited.

The strength improvement information generation unit 67 strength improvement information storage unit 67a which associates and stores the generated strength improvement information and the player identification information (terminal ID and player ID). The strength improvement information generation unit 67 outputs the strength improvement information stored in the strength improvement information storage unit 67a to the distribution unit 68.

The distribution unit 68 distributes the strength improvement information to the terminal device 102 of the player who was determined to exist in the ballpark during the time span that the ballgame was being played in the real world by the player existence determination unit 66.

As the strength improvement information that is generated by the strength improvement information generation unit 67 and distributed by the distribution unit 68 to the terminal device 102, mainly two modes can be considered. One is the mode where the strength improvement information itself that is distributed from the game server 101 to the terminal device 102 preliminarily contains the strength improvement content on what kind of strength improvement will be performed. For example, specific strength improvement content such as "improve the capability of all characters configuring the team across the board at a predetermined ratio (for instance, 5%)", "improve the capability of certain characters (for example, the battery) configuring the team at a predetermined ratio (for instance, 20%)" or "use a special character (helper) having a predetermined high capability" is contained in the strength improvement information. In the foregoing case, the terminal device 102 that received the strength improvement information will reflect the strength improvement content that was uniquely designated by the game server 101 according to the strength improvement information.

As another mode of the strength improvement information, rather than preliminarily including the strength improvement content that was uniquely designated by the game server 101 in the strength improvement information, with the strength improvement information for improving the strength as the trigger (permission information), considered may be a mode where the terminal device 102 that received the strength improvement information allowing the player to select an arbitrary strength improvement content among the plurality of different options of the strength improvement content. For example, the player can select the strength improvement content among a plurality of contents such as "(1) improve the capability of all characters configuring the team across the board by 5%", "(2) use a special character (helper) having a predetermined high capability", "(3) improve team level (increase rank of entire team)", "(4) improve the capability of three characters that are arbitrarily (selected) by the player by 15%", "(5) improve the capability of only the battery (pitcher and catcher) by 20%", and "(6) improve the offense capability or defense capability, whichever is selected by the player, for all player characters by 10%". Moreover, for example, it is also possible to allow the player only to select certain options (for example, (1) to (3) only) among the options (1) to (6) when the player visits the ballpark in the real world for the first time, and increase the number of selectable options as the number of visits (or frequency) that the player makes to the ballpark increases. In the foregoing case, the strength improvement information will include information concerning the selectable options. In the case of this mode of strength improvement information, since the player is given the option (discretion) of selecting the strength improvement content, the amusement can be improved. In this embodiment, the mode where the player is given the discretion of selecting the strength improvement content is mainly explained.

As the mode of distribution from the distribution unit 68 to the player's terminal device 102, considered may be a mode where the distribution unit 68 distributes the strength improvement information to the terminal device 102 of the player in the ballpark immediately after the ballgame in the real world is over and the strength improvement information generation unit 67 generates the strength improvement information. For example, if the terminal device 102 includes a function for receiving emails (or mobile phone emails), the distribution unit 68 could send the strength improvement information as an attachment of an email to the player's terminal device 102. Moreover, the distribution unit 68 can also notify the player's terminal device 102 to the effect that the strength improvement information was generated, and the player that received the notification can operate the terminal device 102 to log into the game server 101 so that the strength improvement information is distributed from the distribution unit 68 to the terminal device 102.

Otherwise, if the login state of the player's terminal device 102 is being maintained until the end of the ballgame for the existence determination by the player existence determination unit 66 (or if the player's terminal device 102 is logged into and connected with the game server 101 after the ballgame is over or within a predetermined time after the ballgame is over), the distribution unit 68 can distribute the strength improvement information to the terminal device 102 in a logged-in state.

Figure 6:
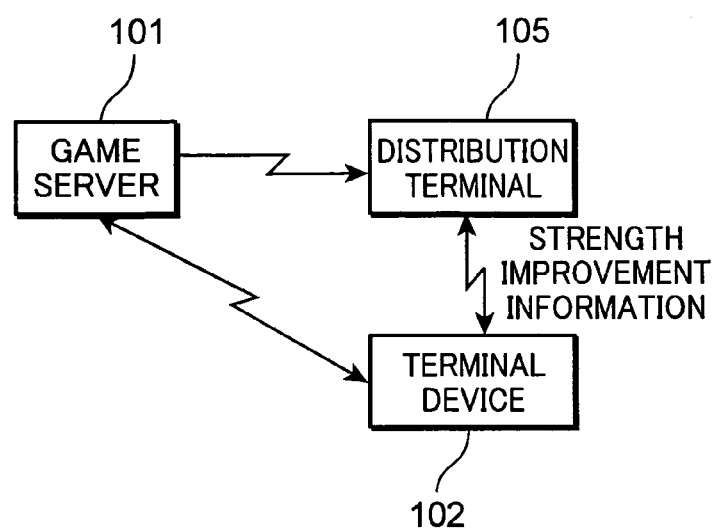
FIG. 6 is a explanatory diagram showing another overall configuration example of the game system according to an embodiment of the present invention.

Otherwise, as shown in FIG. 6, the strength improvement information can also be distributed to the player's terminal device 102 via the distribution terminal 105 of the strength improvement information that is disposed at a predetermined location within the ballpark where the player had visited (for example, near the entrance/exist of the ballpark). Moreover, the strength improvement information can also be distributed to the player's terminal device 102 via the distribution terminal 105 of the strength improvement information that is disposed at a predetermined location outside the ballpark where the player had visited (for example, a game room located in the area (municipality) where the ballpark is located). With this kind of distribution of the strength improvement information via the distribution terminal 105, the game server 101 and the distribution terminal 105 are communicably connected, and the distribution of the strength improvement information between the game server 101 and the terminal device 102 is relayed by the distribution terminal 105. In the foregoing case, the game server 101 and the distribution terminal 105 are connected in a mutually communicable manner based on one or a combination of communication paths such as a mobile communication line, a public line, a dedicated line, a LAN, interne, and the like. Moreover, in the foregoing case, since the terminal device 102 and the distribution terminal 105 are communicable at a short distance, the two can be connected, for example, via infrared communication, communication based on USB connection, wired LAN or wireless LAN.

Note that the timing of the distribution unit 68 distributing the strength improvement information to the player's terminal device 102 does not need to be immediately after the ballgame in the real world is over (immediately after the strength improvement information is generated). In other words, so as long as it is after the strength improvement information has been generated, the distribution unit 68 distribute the strength improvement information to the player's terminal device 102 when the player logs into and connects with the game server 101 at an arbitrary timing. In the foregoing case, the game server 101 has associated the generated strength improvement information with the player identification information (terminal ID and player ID) and stores this in the strength improvement information storage unit 67a, and stores and manages the strength improvement information until the distribution of the strength improvement information is complete. Note that, in the foregoing case, if the player who is able to acquire the strength improvement information does not operate the terminal device 102 to log into the and connect with the game server 101 for a long period of time, there may be cases where the game server 101 needs to store and manage the strength improvement information for a long period of time. Thus, a predetermined time limit may be set to the storage period of the strength improvement information.

The main functions of the terminal device 102 are now explained. As shown in FIG. 5, the control unit 10a of the terminal device 102 comprises a position information acquisition unit 75, a time information acquisition unit 76, an existence fact information input unit 77, an information sending unit 78, a strength improvement information reception unit 79, a selection unit 80, a strength management unit 81, a match-up area management unit 88, an image display unit 91, a capability setting unit 93 and a character movement control unit 94.

The position information acquisition unit 75 acquires the current position information (latitude and longitude information of the current position) that is input from the GPS positioning unit 43*a* (refer to FIG. 3) which receives a positioning radio signal from the GPS satellite and performs the positioning. The time information acquisition unit 76 acquires, as the current time information, the time that the position information acquisition unit 75 acquired the current position information based on a clock that is built into the terminal device 102. The current position information acquired by the position information acquisition unit 75 and the current time information acquired by the time information acquisition unit 76 are output to the information sending unit 78.

Meanwhile, certain imaging devices (cameras) equipped with the GPS positioning function have a function of adding the GPS positioning information and imaging time information of the imaged location to the imaging data. In the case of a terminal device 102 including this kind of imaging device, if the player takes an image with the imaging device in the ballpark of the real world (the imaging target is arbitrary), upon acquiring the imaging data, it is also possible to acquire the GPS positioning information as the current position information and the imaging time information as the current time information. Thus, the imaging data added with the GPS positioning information and the imaging time information can be used as the data containing the current position information and the current time information.

Note that, in this embodiment, although a configuration example is shown where the position information acquisition unit 75 uses the GPS positioning to acquire the current position information (latitude and longitude information of the current position), the configuration is not limited thereto. For example, if the terminal device 102 is equipped with a wireless phone function (mobile phone function or PHS (Personal Handy-phone System) function), the base station identification information of the wireless phone base station can be used as the current position information. In other words, the respective base stations of a mobile phone or a PHS are disposed in a cellular shape having a predetermined communication area, and, based on the base station identification information received from the respective base stations, it is possible to know that the terminal device 102 exists in the communication area of the base station. Thus, although the accuracy as the current position information will be inferior to the latitude and longitude information of the GPS positioning, the base station identification information can also be used as the current position information.

Moreover, for example, if the terminal device 102 is equipped with a wireless LAN communication function such as Wi-Fi (wireless fidelity, registered trademark of Wi-Fi Alliance), the identification information (for example, MAC (Media Access Control) address or IP (Internet Protocol) address) of the wireless communication base unit (wireless LAN access point or router) can be used as the current position information. In other words, a wireless communication base unit (one or more wireless LAN access points or routers) which enables wireless communication in substantially the entire area of the ballpark is installed in the ballpark of the real world, and, when the player operates the terminal device 102 and accesses the wireless communication base unit of the wireless LAN access point or the like, the terminal device 102 can acquire the identification of the wireless communication base unit as the current position information. In the foregoing case, based on the acquired identification information of the wireless communication base unit, it is possible to know that the terminal device 102 exists within the communication area of the wireless communication base unit (in other words, within the ballpark of the real world), and the identification information of the wireless communication base unit can be used as the current position information.

The existence fact information input unit 77 uses an input operation unit 41*a* (refer to FIG. 3) such as an imaging device (camera) or game controller/buttons and imports the foregoing existence fact information (image information, barcode information, or character/number/symbol information such as a keyword or password that cannot be imaged, acquired or confirmed unless the player visits the predetermined area in the real world during the predetermined time span). The existence fact information that was input by the existence fact information input unit 77 is output to the information sending unit 78.

Note that, in this embodiment, although the terminal device 102 is illustrated as having a configuration of comprising the position information acquisition unit 75, the time information acquisition unit 76 and the existence fact information input unit 77, the configuration may also be such that only the position information acquisition unit 75 and the time information acquisition unit 76 are provided, or the configuration may be such that only the existence fact information input unit 77 is provided.

Note that, if a certain player who acquired the existence fact information such as the image information, barcode information, or character/number/symbol information at a ballpark in the real world transfers it to another player, there is a possibility that such other player will be able to acquire such existence fact information without actually visiting the ballpark. Thus, rather than the configuration using the existence fact information input unit 77, the configuration using the position information acquisition unit 75 and the time information acquisition unit 76 is more desirable.

For example, in order to substantially invalidate the existence fact information that was acquired by a certain player who acquired such existence fact information at a ballpark in the real world even though it is transferred to another player who did not visit the ballpark, it is possible to change the existence fact information that can be acquired in the ballpark every predetermined time (for example, every minute), and setting a valid period in the acquired existence fact information. As a configuration example for realizing the above, considered may be a configuration where a wireless communication base unit (one or more wireless LAN access points or routers) which enables wireless communication in substantially the entire area of the ballpark is installed in the ballpark of the real world, and, when the player operates the terminal device 102 and accesses the wireless communication base unit of the wireless LAN access point or the like, the existence fact information which changes every predetermined time can be acquired from the existence fact information generation unit connected to the wireless LAN access point. In the foregoing case, the existence fact information generation unit and the game server 101 are temporally synchronized, and the two generate the existence fact information by using the same algorithm while changing it every predetermined time.

Moreover, as a result of connecting the wireless LAN access point of the like that is installed in the ballpark of the real world to the game server 101 via the internet or the like, the game server 101 can directly determine whether the player exists in the ballpark during the ballgame time span. In other words, the player's terminal device 102 that logged into and connected with the game server 101 via the wireless LAN access point or the like installed in the ballpark obviously exists within the ballpark, and, if the login time is during the ballgame time span, it is possible to determine that the player carrying the terminal device 102 exists in the ballpark during the ballgame time span.

The information sending unit 78 sends, to the game server 101, the current position information acquired by the position information acquisition unit 75, the current time information acquired by the time information acquisition unit 76, and the existence fact information input by the existence fact information input unit 77.

The strength improvement information reception unit 79 receives the strength improvement information distributed from the game server 101, and stores the strength improvement information in a storage area of a nonvolatile storage medium such as a hard disk or a memory card.

Figure 8A:
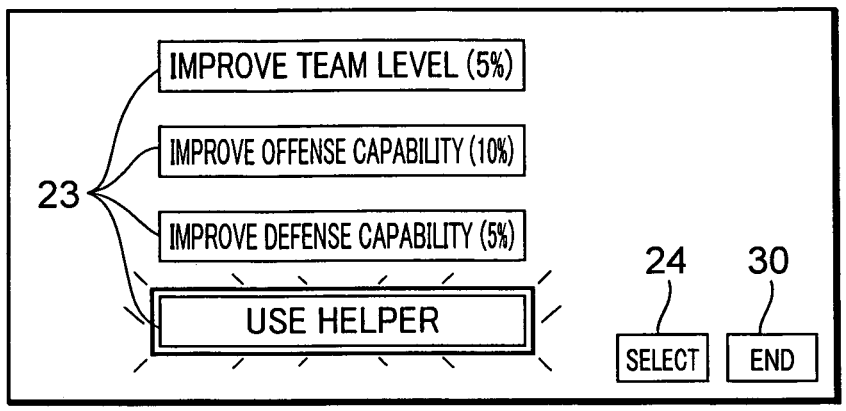
FIG. 8A to FIG. 8C are explanatory diagram showing an example of the screen transition in the terminal device configuring the game system according to an embodiment of the present invention.
Figure 8B:
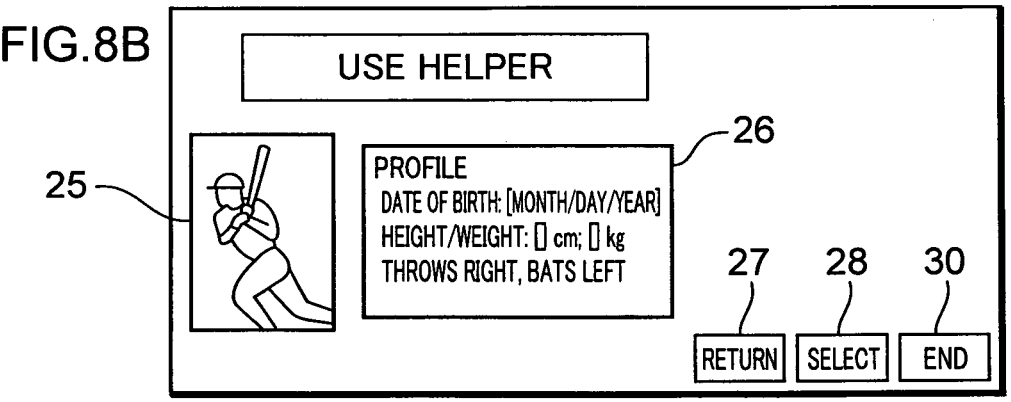
Figure 8C:
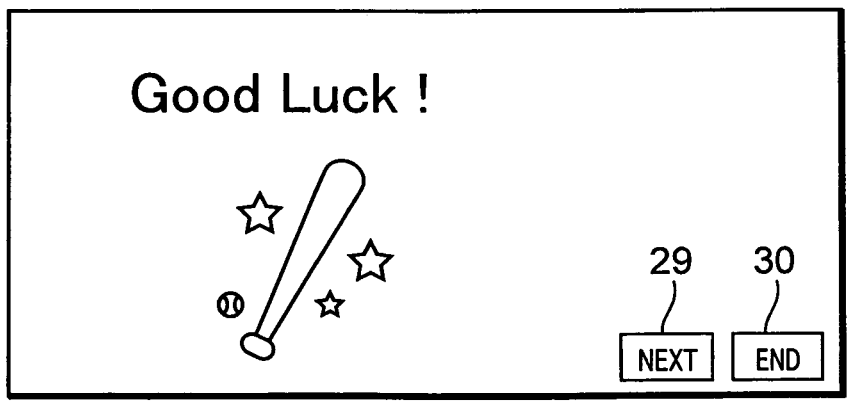

When the strength improvement information reception unit 79 receives the strength improvement information, the selection unit 80 executes selection processing for allowing the player to select an arbitrary strength improvement content among a plurality of different options of the strength improvement content. An example of this selection processing is shown in FIG. 8A to FIG. 8C. FIG. 8A to FIG. 8C show a transition example of the respective screens.

Figure 7A:
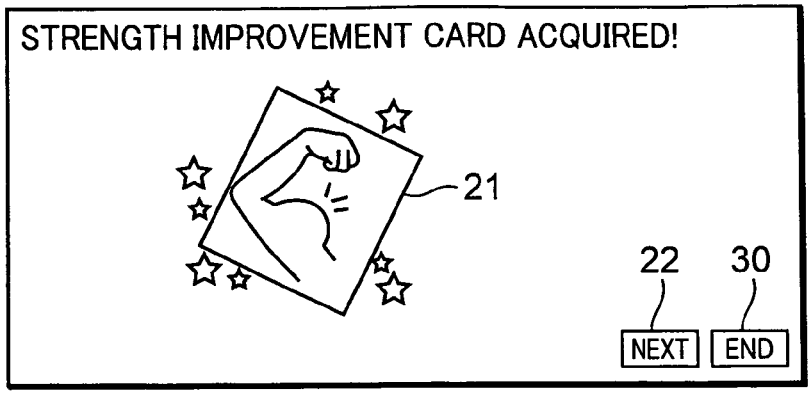
FIG. 7A to FIG. 7D are explanatory diagram showing an example of the screen transition in the terminal device configuring the game system according to an embodiment of the present invention.

Note that, as described later, when the strength improvement information distributed from the game server 101 is received, foremost, as shown in FIG. 7A, a strength improvement card 21 is displayed on the screen of the terminal device 102, and the player is thereby able to recognize that he/she can enjoy the advantage of strength improvement. Here, although an example where the strength improvement information is displayed on the screen as the strength improvement card 21, it is also possible to allow the player to recognize that the strength improvement information was received based on a different screen display, and, for example, it is possible to display a symbol in the shape of a ball or a bat, a character string or other signs, or a combination thereof. Subsequently, as also described later, on the condition that the player selects the same in-game ballpark as the ballpark that the player actually visited, as shown in FIG. 8A, a plurality of options 23 of different strength improvement contents are displayed. On the screen displaying the plurality of options 23, the player can select the arbitrary strength improvement content by performing predetermined button operations or pointing device operations. If, for example, the player selects "use helper" on the screen of FIG. 8A displaying the plurality of options 23, the screen changes to the screen of FIG. 8B to allow the player to confirm the profile and the like of the helper (special character with high capability). The detailed explanation of the respective screens of FIG. 8 will be provided later.

The player is thereby able to enjoy only the strength improvement content that was selected with the selection unit 80. In other words, only the strength improvement content that was selected with the selection unit 80 is valid, and this strength improvement content is stored in the strength improvement content information storage unit 83 of the strength management unit 81.

Meanwhile, if the player visits a plurality of different ballparks, that player can acquire the strength improvement information of the in-game match-up areas corresponding to the respective ballparks. Moreover, if the player visits the same ballpark on numerous occasions on different days, that player can acquire a plurality of strength improvement information of the in-game match-up area corresponding to the same ballpark. In the case where the player acquires a plurality of strength improvement information of the same in-game match-up area, the strength improvement is added. As described later, even in cases where a time limit is set to the strength improvement period based on the strength improvement information, if the player visits the same ballpark numerous times within the time limit, the strength improvement can be added. In other words, there are cases where a plurality of strength improvement contents are stored in the strength improvement content information storage unit 83.

Note that, in this embodiment, the operation of causing the player to select an arbitrary strength improvement content among a plurality of different strength improvement content options on the terminal device 102 side that received the strength improvement information with the strength improvement information as the trigger (permission information) was explained. However, as described above, if the strength improvement information itself that is distributed to the terminal device 102 from the game server 101 contains the strength improvement content on what kind of strength improvement will be performed, the selection unit 80 can be omitted.

The strength management unit 81 comprises a character information storage unit 82, a strength improvement content information storage unit 83, a character capability change unit 84, a changed character information storage unit 85, a special character generation unit 86, and a time limit management unit 87.

The character information storage unit 82 associates the respective in-game characters with the identification information (character ID) for uniquely identifying the same, and stores the image information of the respective characters, profile information of the respective characters, and capability values of the respective characters (if the character is a pitcher, capability values such as ball speed, ball control, stamina and the like, and if the character is a fielder, capability values such as hitting power, running speed, defense ability and the like) are stored in a storage area of a nonvolatile storage medium such as a hard disk or a memory card. Moreover, the character information storage unit 82 can manage the characters in which their capabilities were improved based on the strength improvement information by raising a capability change flag (one-bit information).

The strength improvement content information storage unit 83 associates the strength improvement content that was selected using the selection unit 80 with the ballpark ID which identifies the ballpark where the player had visited, and stores this in a storage area of a nonvolatile storage medium such as a hard disk or a memory card. The strength improvement content is activated as a result of the in-game match-up area (in-game ballpark) corresponding to the ballpark where the player actually visited being selected when the game is executed, and the character capability change unit 84 or the special character generation unit 86 performs the following processing for strength improvement according to the strength improvement content.

When the strength improvement content selected using the selection unit 80 is to improve the capability of all or certain characters configuring the team at a predetermined ratio, the character capability change unit 84 changes the capability value of the target characters based on the strength improvement content.

As described above, in cases where the player visits the same ballpark numerous times on different days and acquires a plurality of strength improvement information of the same in-game match-up area, if the character capability change unit 84 is to change the capability of all or a part of the characters by adding the strength improvement information a plurality of times, desirably, the character capability change unit 84 gradually decreases the variation or change rate o the capability value of the target characters according to the number of changes (number of times addition is performed). As a specific example, in the case of an initial change (that is, no addition), the variation or change rage of the capability value is applied as is, and, in the second change, the variation or change rate is applied by being reduced to 80% (for example, in the case of "improve the capability of all characters configuring the team across the board by 5%", 5% improvement is applied in the initial change, and 4% is added in the second change). Moreover, in the third change, the change rate is applied by being reduced to 60% (in the case of the foregoing example, 3% is added). Subsequently, in the nth (n is a natural number that is not greater than 5) change, the variation or change rate of the capability value of the character is applied by being reduced to $\{100-20\times(n-1)\}$%, and the application for the sixth change onward is reduced to 10% across the board. This is merely an example, and the level of gradually decreasing the variation or change rage of the capability value of the character can be arbitrarily set. Consequently, even in cases where the player visits the same ballpark numerous times on different days and acquires a plurality of strength improvement information of the same in-game match-up area and the capability improvement of all or certain characters is applied by being added a plurality of times, it is possible to inhibit the team strength from unnaturally standing out, and maintain the balance of the overall game. Consequently, for example, in cases where players play the game via a network, there are cases where a sense of unfairness arises if the team strength is too overwhelming and the ballgame becomes one-sided. However, this kind of problem can be avoided in advance with the present invention.

As another method, it is also possible to inhibit the team strength from unnaturally standing out by limiting the number of times that the capability improvement can be added upon adding the capability improvement of all or certain characters a plurality of times.

Moreover, as described later, when a time limit (for example, a time limit of one week) is set to the strength improvement period based on the strength improvement information, the number of times that a player can visit the same ballpark within the time limit will be substantially limited, and it will be possible to inhibit the team strength from unnaturally standing out.

The changed character information storage unit 85 associates the capability values of the character that were changed by the character capability change unit 84 with the foregoing character ID, and stores this in a storage area of a nonvolatile storage medium such as a hard disk or a memory card. Moreover, the changed character information storage unit 85 additionally stores the number of times that the capability value was changed by the character capability change unit 84 (or the number of times that the improvement in the capability value was added).

The special character generation unit 86 generates a special character based on the strength improvement content when the strength improvement content that was selected by the selection unit 80 is for using a special character (helper) with predetermined high capability. As a result of the player using the special character (helper) as a team member, the team strength can be improved indirectly.

As described above, in cases where the player visits the same ballpark numerous times on different days and acquires a plurality of strength improvement information of the same in-game match-up area, if the special character generation unit 86 is to generate a special character a plurality of times based on the plurality of strength improvement information, desirably, the special character generation unit 86 gradually decreases the capability value of the special character that is generated as the number of generations increases. For example, when the capability value of the special character that is initially generated is "25", then the capability value of the special character that is generated the second time is set to "23", and the capability value of the special character that is generated the third time is set to "21". This is merely an example, and the level of gradually decreasing the capability value of the special character can be arbitrarily set. Consequently, even in cases where the player visits the same ballpark numerous times on different days and acquires a plurality of strength improvement information of the same in-game match-up area, and the special characters are generated a plurality of times, it is possible to inhibit the team strength from unnaturally standing out, and maintain the balance of the overall game.

Moreover, if there are a plurality of special characters with predetermined high capability in the team, again the team strength will unnaturally stand out. Thus, desirably, the number of special characters is limited to a predetermined number (for example, up to three special characters).

The time limit management unit 87 performs time limit management of enabling the strength improvement based on the strength improvement information only within a predetermined period from the time that the strength improvement information was received from the game server 101. Otherwise, the time limit management unit 87 performs time limit management of enabling the strength improvement based on the strength improvement information only within a predetermined period from the time that the strength was initially improved in the game based on the strength improvement information. In other words, the commencement of the period of enabling the strength improvement can be either when the strength improvement information was received, or when the strength improvement based on the strength improvement information was enabled in the game. Since a time limit is set in the strength improvement as described above, the player can play the ballgame with an advantageous strength if it is within the time limit, and consequently improve one's winning percentage by playing numerous games. In a game system that offers strength improvement based on team cultivation (cultivation of characters), increases the capability evaluation level (virtual rank, reward, frame, class or the like), or increases the ranking (national ranking or the like) when the player wins in a versus game, if many games are played within the time limit of improving the strength, the cultivation of characters and improvement in the capability evaluation level and ranking can be effectively conducted. Thus, the player is motivated to actively play the game within the time limit, and it is possible to realize a game system possessing nonconventional amusement.

Moreover, the time limit management unit 87 can also limit the number of matches that enable the strength improvement within the time limit that enables the strength improvement based on the strength improvement information to a predetermined number (for example, ten ballgames). In the foregoing case, even if it is within the valid period of the strength improvement, the effect of strength improvement will be lost upon the number of matches reaching its limit. By setting a valid period and limiting the number of valid matches, the advantage that is obtained by once visiting a ballpark in the real world can be limited to an appropriate range while motivating the player to actively play the game within the time limit.

If a valid period is not set in the strength improvement based on the strength improvement information, then the time limit management unit 87 can be omitted.

Note that the foregoing strength improvement information reception unit 79, selection unit 80 and strength management unit 81 configure the strength improvement unit of the present invention.

The match-up area management unit 88 comprises a match-up area information storage unit 89 and a match-up area selection unit 90, and manages a plurality of in-game match-up areas that can be used in the game. The match-up area information storage unit 89 associates the predetermined ballpark of the real world with the identification information (ballpark ID) capable of uniquely identifying the corresponding in-game match-up area (in-game ballpark), and stores the image information of the respective in-game match-up areas in a predetermined storage area. For example, the match-up area information storage unit 89 stores image information of the 12 in-game match-up areas corresponding to the home fields of 12 baseball clubs in Japanese professional baseball, or the 30 in-game match-up areas corresponding to the home fields of the 30 baseball clubs in the Major leagues.

Moreover, the match-up area information storage unit 89 can manage the in-game match-up area in-game match-up areas for which the strength can be improved based on the strength improvement information by raising a strength up flag (one-bit information). In other words, when the strength improvement information is received from the game server 101 and the strength can be improved, the match-up area management unit 88 raises the strength up flag of the target in-game match-up area, and clears the strength up flag regarding the in-game match-up areas in which the strength improvable time limit managed by the time limit management unit 87 has lapsed.

When the game is started, the match-up area selection unit 90 executes the selection processing for causing the player to select an arbitrary in-game match-up area among a plurality of in-game match-up areas stored in the match-up area information storage unit 89. When the player is to start the game, the match-up area selection unit 90 displays, on the screen of the terminal device 102 as shown in FIG. 7A, a message notifying the player that he/she has acquired a card for improving the strength.

Note that, here, the explanation is provided on the premise that the screen of FIG. 7A is displayed before the game is started, and, in the actual game, a button for confirming the strength improvement availability and a button for directly starting the game without confirming the strength improvement availability can be provided in a selectable manner, and the screen may change to the screen of FIG. 7A only when the strength improvement availability confirmation button is pushed. In the foregoing case, if the player is unable to improve the strength (in other words, if the player has not acquired the strength improvement card described later), a message to such effect can be displayed on the screen (for example, "You have not acquired a strength improvement card"), and the game can be directly started.

Figure 7B:
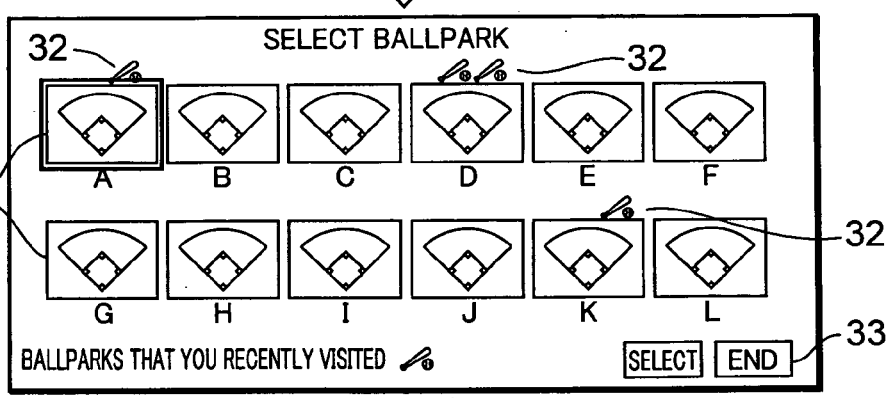

Subsequently, when the player presses the button 22, as shown in the screen of FIG. 7B, a list of reduced ballpark images 31 of the selectable in-game match-up areas (in-game ballparks) is displayed on the screen of the terminal device 102. By performing predetermined button operations and pointing device operations on this screen, the player can select an arbitrary in-game match-up area. Here, the strength improvement specification symbol 32 is displayed on the reduced ballpark image 31 of the in-game match-up area corresponding to the ballpark of the real world that the player has recently visited, and the player can easily comprehend the in-game match-up area for which the strength can be improved as a result of personally visiting the ballpark.

FIG. 7B shows an example where 12 in-game ballparks from ballpark A to ballpark L can be selected. These in-game ballparks (ballpark A to ballpark L) respectively correspond to the ballparks of the real world.

Note that if the player acquires a plurality of strength improvement information for the same in-game ballpark as a result of visiting the same ballpark on numerous occasions on different days, as a result of displaying the strength improvement specification symbol 32 in the same quantity as the number of time that the strength improvement information was acquired on the reduced ballpark image 31 of that in-game ballpark, the player can confirm the number of times that he/she visited that ballpark (that is, the number of times that the strength improvement has been added). Note that the time limit of displaying with the strength improvement specification symbol 32 can be set to, for example, only seven days from the day (including that day) that the player visited the ballpark (after the lapse of seven days, the strength improvement specification symbol 32 disappears). The seventh day corresponds to the strength improvable time limit described later. Accordingly, the player needs to play the game upon leveraging the seven-day period from the day that he/she visited the ballpark. For example, if the player plays the game on the seventh day after the visiting the ballpark, the player will only be able to play the game in a state with improved capability on that day. Needless to say, the time limit is not limited to a seven-day period. This may also be a fourteen-day period as a special service to the player, or be shorted to a three-day period.

Figure 7C:
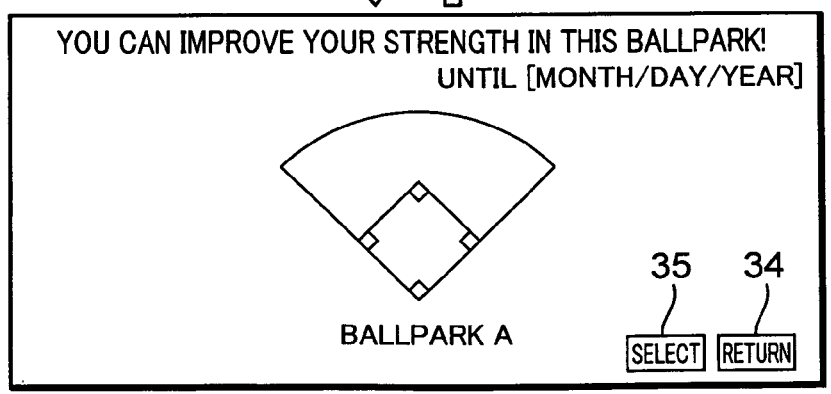

If, for example, the player selects the "ballpark A" for which the strength can be improved and pushes the end button 33 on the screen of FIG. 7B, the screen changes to the screen of FIG. 7C, and the player can confirm the image of the "ballpark A" and the message to the effect that the player can enjoy the advantage of the strength improvement, the strength improvable time limit, and so on. Note that, in the screen of FIG. 7C, if the player pushes the return button 34, the player can return to the previous screen of FIG. 7B and redo the selection of the in-game ballpark.

Figure 7D:
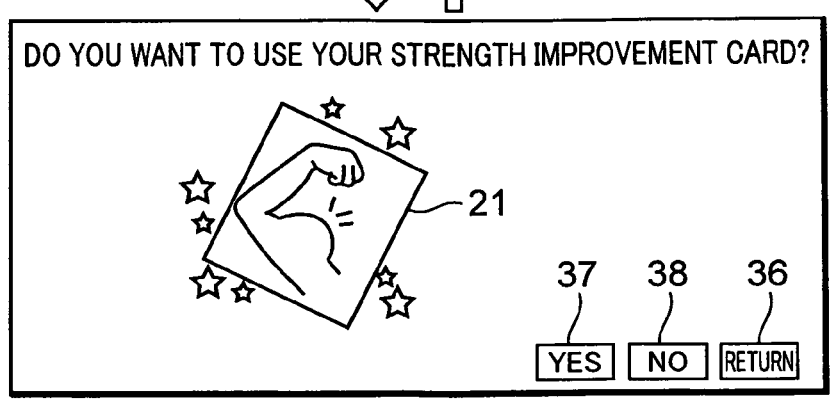

Moreover, if the player pushes the select button 35 on the screen of FIG. 7C, the terminal device 102 can also display a message to the effect of confirming whether to use the acquired strength improvement card 21, for example, as shown in the screen of FIG. 7D. Consequently, if a limitation is additionally set in the number of matches for which the strength improvement is valid during the time limit which enables the strength improvement, the player can decide in which ballgame the strength should be improved within the time limit. The number of matches can be set to, for example, ten ballgames. Note that, even in the screen of FIG. 7D, if the player pushes the return button 36, the screen will return to the previous screen of FIG. 7C, and if the return button 34 is pushed on the screen of FIG. 7C, the player can return to the screen of FIG. 7B to redo the selection of the in-game ballpark.

If the player pushes the YES button 37 on the screen of FIG. 7D, the in-game ballpark (ballpark A in this example) that was selected by the player is subject to strength improvement, and the selection processing of the in-game match-up area is thereby ended. Subsequently, as shown in FIG. 8A to FIG. 8C described later, a more specific content for improving the capability is decided. Moreover, if the player pushes the NO button 38 on the screen of FIG. 7D, the in-game ballpark (ballpark A in this example) that was selected by the player will not be subject to strength improvement.

Meanwhile, if the player selects an in-game ballpark (for example, "ballpark B") in which the strength cannot be improved and pushes the end button 33 on the screen of FIG. 7B, although the image of that in-game ballpark will be displayed on the screen of FIG. 7C, the message that the player can enjoy the advantage of the strength improvement and the strength improvable time limit are not displayed. In the foregoing case, if the player pushes the select button 35 on the screen of FIG. 7C, the selection processing of the in-game match-up area is ended without changing to the screen of FIG. 7D.

The image display unit 91 controls the display image processing unit 20a (refer to FIG. 3) based on the character information that is managed by the strength management unit 81 and the in-game match-up area information that is managed by the match-up area management unit 88, and displays the character and the in-game match-up area on the screen (monitor 21a) of the terminal device 102. Moreover, the image display unit 91 displays, on the monitor 21a of the terminal device 102, images of various screens as shown in FIG. 7A to FIG. 7D and FIG. 8A to FIG. 8C.

The capability setting unit 93 sets the capability of the player character by loading the capability value (capability value of hitting power or the like) of the player character into the RAM 12a and causing the CPU 11a to recognize the same upon executing the game. The character movement control unit 94 controls the movement of the player character during the execution of the game based on the capability of the player character that was recognized by the CPU 11a.

Figure 10:
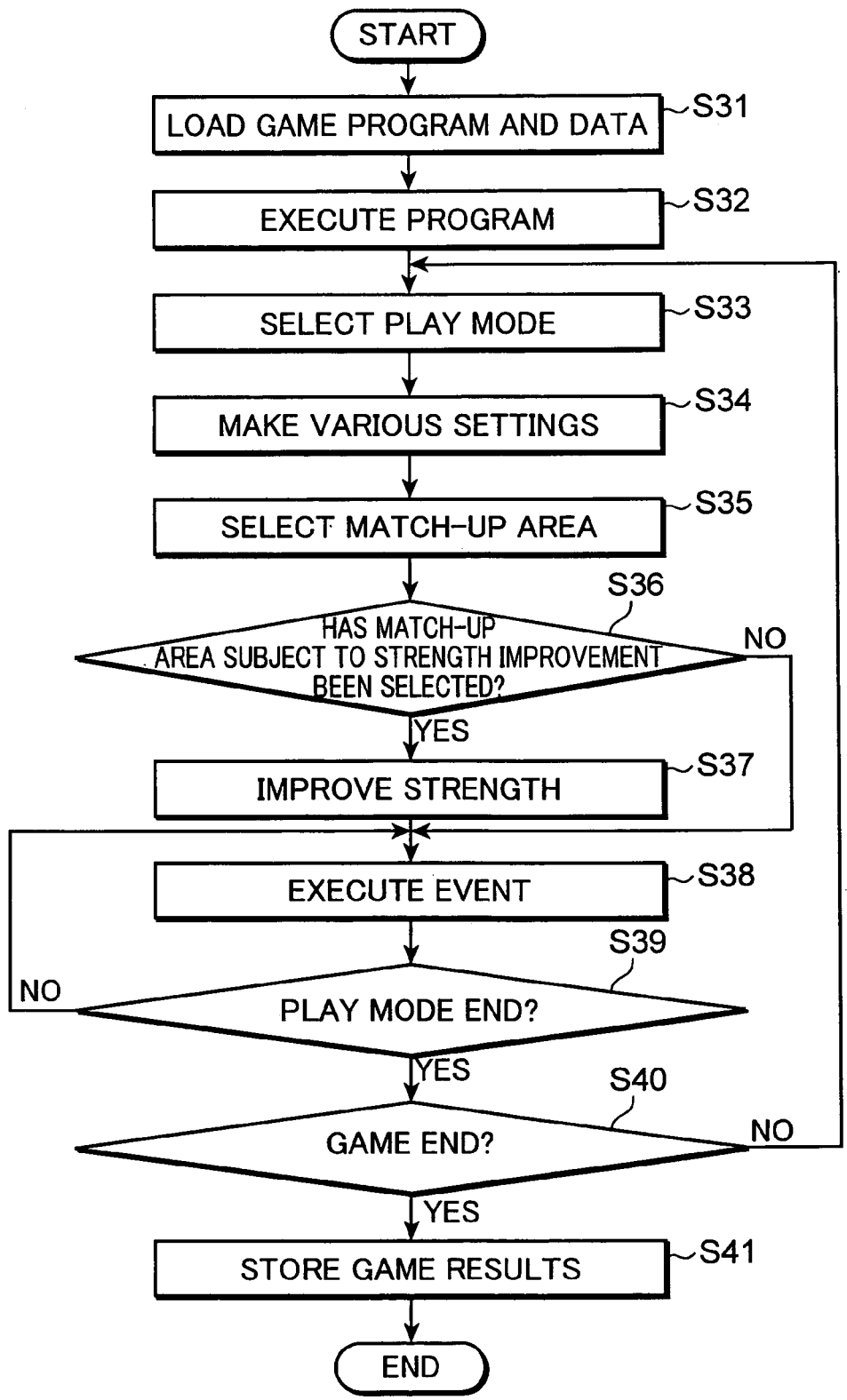
FIG. 10 is a flowchart showing the game operation in the terminal device configuring the game system according to an embodiment of the present invention.

The outline of the operation of the game system 100 according to this embodiment is now explained with reference to the flowchart shown in FIG. 9 and FIG. 10.

The flowchart of FIG. 9 shows an operation example when the player carrying the terminal device 102 visited the ballpark of the real world, and logged into the game server 101 at the ballpark.

The player who visited a predetermined ballpark during a time span when the ballgame is being playing in the real world operates the terminal device 102 and sends a login request to the game server 101 (S11). Here, the game server 101 performs login authentication, and thereafter accepts the login of the player's terminal device 102 (S21).

Subsequently, the terminal device 102 acquires the current position information (latitude and longitude information) from the position information acquisition unit 75 (S12), and acquires the current time information from the time information acquisition unit 76 (S13). Note that, in substitute for the acquisition of the current position information and the current time information, it is also possible to input the existence face information by the existence fact information input unit 77.

Subsequently, the terminal device 102 sends the current position information and current time information acquired from the information sending unit 78 to the game server 101 (S14). Here, the game server 101 receives the current position information and the current time information (S22), and determines whether the player carrying the terminal device 102 exists in a predetermined ball park during the time span that the ballgame is being played in the real world (S23). Here, when the game server 101 determines that the player does not exist in a predetermined ballpark during the time span that the ballgame is being played, the processing is ended a this point in time and the connection with the terminal device 102 is disconnected. However, here, the explanation is continued as follows on the assumption that the player was determined as existing in the predetermined ballpark during the time space when the ballgame is being played.

Subsequently, the game server 101 generates the strength improvement information containing the ballpark ID of the ballpark where the player had visited (S24). Subsequently, the game server 101 distributes the generated strength improvement information to the terminal device 102 (S25). Here, the terminal device 102 receives the strength improvement information (S15). The fact that the strength improvement information was received can be recognized, as described above, by presenting a display to the effect that the player has acquired the strength improvement card 21 on the screen of FIG. 7A when the player is to start the game. The player is thereby able to recognize that he/she can enjoy the advantage of strength improvement as a result of having visited a ballpark in the real world.

Subsequently, the player can proceed to the step of selecting specific strength improvement on the condition of using the same in-game ballpark as the ballpark where the player actually visited as explained in FIG. 7B to FIG. 7D, and the points of such strength improvement are now explained with reference to FIG. 8A to FIG. 8C.

Foremost, the player selects an arbitrary strength improvement content on the screen of FIG. 8A (S16). The screen of FIG. 8A illustrates a list of four different strength improvement content options 23 including "improve team level (5%)", "improve offense capability (10%)", "improve defense capability (10%)", and "use helper". Here, "improve team level (5%)" is the strength improvement content of improving the capability value (all capability values of offensive capability, defensive capability and running capability) of all characters configuring the team across the board by 5%, "improve offense capability (10%)" is the strength improvement content of improving the offensive capability of all characters configuring the team across the board by 10%, "improve defense capability (10%)" is the strength improvement content of improving the defensive capability of all characters configuring the team across the board by 10%, and "use helper" is the strength improvement content of being able to use a special character (helper) with predetermined high capability. Note that the screen of FIG. 8A illustrate four representative strength improvement content options 23, but other strength improvement contents may be used, and the number of options is also not limited to four.

When the player selects an arbitrary strength improvement content and pushes the select button 24 on the screen of FIG. 8A, the screen will change to the screen of FIG. 8B or the screen of FIG. 8C. For example, if "use helper" is selected, the screen changes to the screen of FIG. 8B, and the player can confim the image photograph 25, profile 26 and other information concerning the helper (special character). For example, as the helper, it is possible to apply a special character which simulates a former star player who flourished in the past in the real world. Note that, if the player pushes the return button 27 on the screen of FIG. 8B, the player can return to the previous screen of FIG. 8A, and redo the selection of the strength improvement content. Moreover, if the player pushes the select button 28 on the screen of FIG. 8B, the terminal device 102 presents, for example, a display as shown in the screen of FIG. 8C, and allows the player to recognize the strength improvement content that was selected and decided by the player.

Note that, on the screen of FIG. 8A, when the player selects either "improve team level (5%)", "improve offense capability (10%)" or "improve defense capability (5%)" and then pushes the select button 24, the strength improvement content selected by the player is decided, and the screen directly changes the screen of FIG. 8C without going through the screen of FIG. 8B. Otherwise, if the player selects one strength improvement content on the screen of FIG. 8A and pushes the select button 24, it is also possible to display a confirmation screen that is similar to the screen of FIG. 8B, decide the strength improvement content if the player pushes the select button on the confirmation screen, and then change to the screen of FIG. 8C.

When the selection processing of the strength improvement content is performed as described above and a specific strength improvement content selected by the player is decided, the terminal device 102 stores the strength improvement content in the strength improvement content information storage unit 83 (S17).

Note that, on the screen of FIG. 8C, if the player pushes the next button 29, the player can subsequently play the game. Moreover, if the player pushes the end button 30 on any of the screens of FIG. 8A to FIG. 8C, the terminal device 102 ends the processing of these screens and ends the routine of the flowchart, although is not reflected in the flowchart of FIG. 9.

Note that, in the foregoing explanation, the operation of causing the player to select an arbitrary strength improvement content among a plurality of different strength improvement content options on the terminal device 102 side that received the strength improvement information with the strength improvement information as the trigger (permission information) was explained. However, in a case where the game server 101 is to designate the strength improvement content and the strength improvement information itself that is distributed to the terminal device 102 contains the strength improvement content on what kind of strength improvement will be performed, foregoing S16 is omitted. In the foregoing case, on the screen of FIG. 7D, the strength improvement content that was designated by the game server 101 is specified together with the strength improvement card 21, and the screen does not change to the screen of FIG. 8A which is the selection screen of the strength improvement content. Moreover, if the strength improvement content designated by the game server 101 is "use helper", the image photograph or 3D image of the helper (special character) can be displayed in substitute for the strength improvement card 21.

The outline of the baseball game is now explained with reference to the flowchart of FIG. 10. When the start button of the baseball game is pushed using the terminal device 102, the game program is loaded and stored in the RAM 12a from the ROM 13a or recording medium storing such game program (S31). Here, various types of basic game data which are required for executing the baseball game are also loaded and stored in the RAM 12a from the ROM 13a or the recording medium (S31). Consequently, the game program and the basic game data are recognized by the CPU 11a of the terminal device 102. Here, as the basic game data, included are data concerning the various images for use in a three-dimensional game space (for example, image data of the in-game ballparks, image data of the respective player characters, image data of various objects, and so on) and positional coordinate data for disposing, in the three-dimensional game space, the data concerning the various images for use in a three-dimensional game space.

Subsequently, the CPU 11a of the terminal device 102 executes the game program based on the basic game data stored in the RAM 12a (S32). Under normal circumstances, the initial screen is displayed on the monitor 21a when the game program of the baseball game is booted, thereby allowing the various settings for executing the baseball game. For example, if the baseball game includes a plurality of play modes, a play mode selection screen for selecting the play mode is displayed on the monitor 21a. The player can select the play mode by operating the input operation unit 41a on this play mode selection screen (S33). As the play modes, for example, prepared may be a general manager play mode in which the player gathers player characters to form one's own team plays against opponents as a general manager, a versus mode of selecting a specific team among the 12 baseball clubs (or among the 30 baseball clubs for a game of Major league baseball) and playing one ballgame, a pennant mode of selecting a specific team among the 12 baseball clubs and playing the pennant race, and a growth experiencing mode where the player becomes one of the player characters and experiences the baseball game. Here, the explanation is continued on the assumption that the general manager play mode has been selected.

After the general manager play mode is selected, the player makes various settings that are required for this mode (S34). In the case of this embodiment, the player performs settings for selecting the player characters and configuring one's own team.

Subsequently, the player selects the in-game match-up area (in-game ballpark) (S35).

In the case of this embodiment, on the screen of FIG. 7B, the strength improvement specification symbol 32 is displayed on the reduced ballpark image 31 of the in-game ballpark corresponding to the ballpark of the real world where the player had recently visited, and the player is thereby able to easily comprehend the in-game ballpark for which the strength can be improved as a result of having personally visited that ballpark.

When an in-game ballpark subject to strength improvement was selected in the selection processing of the in-game match-up area in S35 (YES in S36), the strength management unit 81 (refer to FIG. 5) of the terminal device 102 activates the strength improvement content of the in-game ballpark stored in the strength improvement content information storage unit 83, and performs the strength improvement processing according to the strength improvement content (S37). In other words, when the strength improvement content is to improve the capability of all or certain characters configuring the team at a predetermined ratio, the character capability change unit 84 changes the capability value of the target characters based on the strength improvement content, and the improvement of the team strength is thereby obtained. Moreover, when the strength improvement content is to use the special character (helper), the special character generation unit 86 generates a special character based on the strength improvement content, and the team strength is improved as a result of using the special character as a team member.

The game is thereafter started, and various events are executed by the CPU 11a of the terminal device 102 (S38). The various events that are executed include, for example, an event where the player characters are automatically controlled by the CPU 11a based on an AI program, and an even where the player characters and the like are manually controlled by the player based on the input signal from the input operation unit 41a. If the strength improvement is performed in any of the events, the movement of the character will be controlled based on the capability value of that character to which the strength improvement content was reflected. Based on this improvement in strength, the player can play the ballgame more advantageously, and the player's winning percentage will consequently improve.

If the player wins the ballgame, it is also possible to improve that player's team strength even further by applying conventional techniques. In the foregoing case, as a result of the player actively playing the game during the period that the winning percentage is improving as a result of the strength improvement being performed, it will be possible to achieve even more effective cultivation and improvement of the team strength.

Subsequently, the CPU 11a determines whether the general manager play mode has ended (S39), and, when such mode has ended (YES in S39S), a selection screen for selecting whether to end the baseball game is displayed on the monitor 21a. Here, if the player operates the input operation unit 41a and selects to end the baseball game (YES in S40), the CPU 11a executes processing for ending the baseball game, and the game results are stored in a nonvolatile recording medium such as a hard disk or a memory card (S41). Meanwhile, if the player operates the input operation unit 41a and selects to continue the baseball game (NO in S40), the routine proceeds to S33 and the play mode selection screen is displayed.

[Other Configuration Examples of Game System]

Configuration examples of the game system which are different from the configuration shown in FIG. 1 are now explained with reference to FIG. 11 to FIG. 13. Note that the same reference numeral is given to the configuration that is the same as the configuration shown in FIG. 1 and the like, and the explanation thereof is omitted.

Since the configuration shown in FIG. 1 is based on the premise of the player carrying the terminal device 102 to a ballpark in the real world, as the terminal device 102, preferably used may be a portable (compact) domestic game machine, laptop, book-type or pad-type personal computer, an portable information terminal such as a PDA (Personal Digital Assistant), a mobile phone, PHS or smart phone capable of executing the game application. Meanwhile, if a stationary domestic game machine or desktop personal computer, which is unsuitable for carrying around, is to be used as the terminal device, it is preferable to apply the configuration of the game system 200 shown in FIG. 11.

Figure 11:
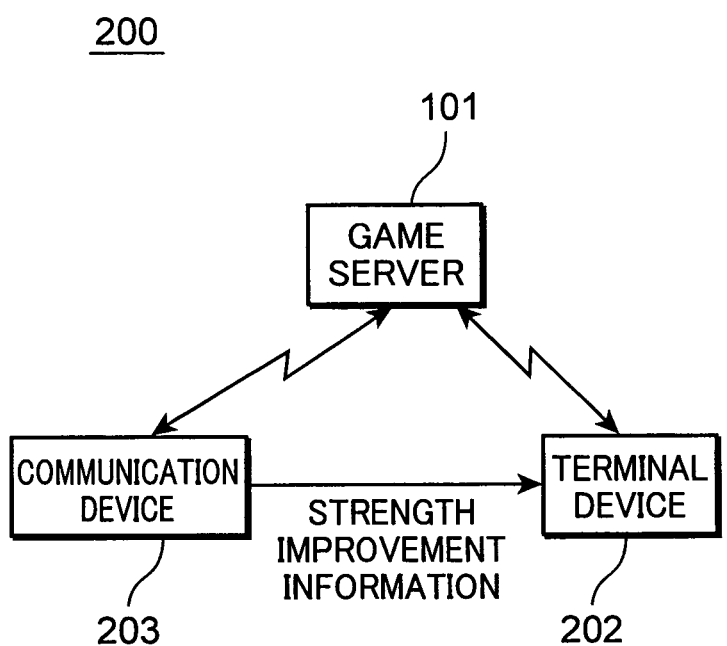
FIG. 11 is an explanatory diagram showing another overall configuration example of the game system according to an embodiment of the present invention.

As shown in FIG. 11, the game system 200 comprises a game server 101, a terminal device 202, and a communication device 203 which is communicable connected to the game server 101.

As the terminal device 202, in addition to the foregoing stationary domestic game machine and desktop personal computer, a portable (compact) domestic game machine, laptop, book-type or pad-type personal computer, and an portable information terminal such as a PDA can also be applied.

The communication device 203 is preferably a device that the player can easily carry to the predetermined ballpark in the real world. As examples of the communication device 203, there are, for example, a mobile phone, PHS (Personal Handy-phone System) terminal, portable information terminal (PDA), and a smart phone which is a combination of a mobile phone, a PHS and a portable information terminal. The communication device 203 is configured so that it can transfer the strength improvement information received from the game server 101 to the terminal device 202.

The game server 101 and the communication device 203 are connected in a mutually communicable manner based on one or a combination of communication paths such as a mobile communication line, a public line, a dedicated line, a LAN, internet, and the like.

Figure 12:
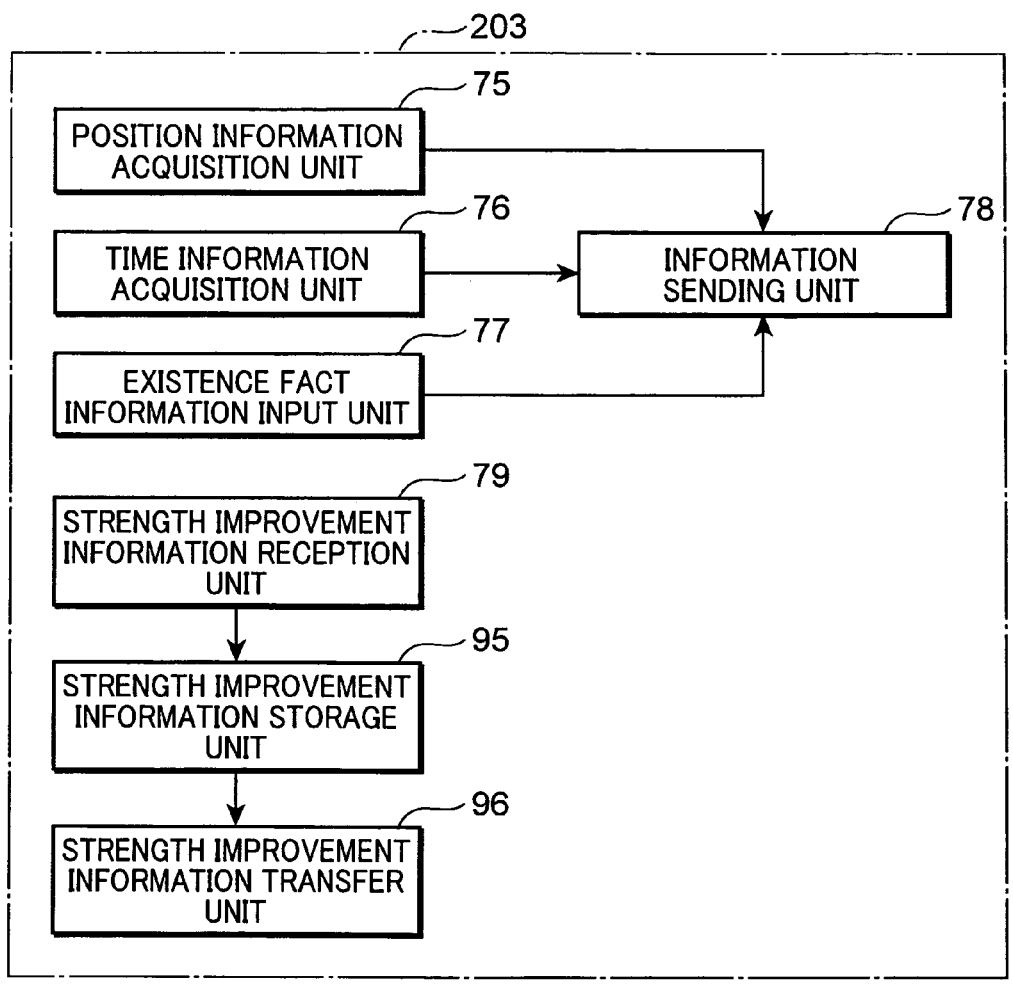
FIG. 12 is a functional block diagram of the communication device configuring the game system according to an embodiment of the present invention.

As shown in FIG. 12, the communication device 203 comprises, in addition to the position information acquisition unit 75, the time information acquisition unit 76, the existence fact information input unit 77, the information sending unit 78, and the strength improvement information reception unit 79 which were explained above, a strength improvement information storage unit 95 and a strength improvement information transfer unit 96.

Note that, in this embodiment, although the communication device 203 is illustrated as having a configuration of comprising the position information acquisition unit 75, the time information acquisition unit 76 and the existence fact information input unit 77, the configuration may also be such that only the position information acquisition unit 75 and the time information acquisition unit 76 are provided, or the configuration may be such that only the existence fact information input unit 77 is provided.

The strength improvement information storage unit 95 stores the strength improvement information that the strength improvement information reception unit 79 received from the game server 101 in a memory. The strength improvement information transfer unit 96 has a function of transferring the strength improvement information stored in the strength improvement information storage unit 95 to the terminal device 202. For example, when transferring the strength improvement information to the communication device 203 based on infrared communication or communication based on USB connection, the strength improvement information transfer unit 96 can be configured from an infrared communication means or the like. Moreover, when transferring the strength improvement information to the communication device 203 via a storage medium such as an SD card, the strength improvement information transfer unit 96 can be configured from a medium recording means such as an SD card writer.

Figure 13:
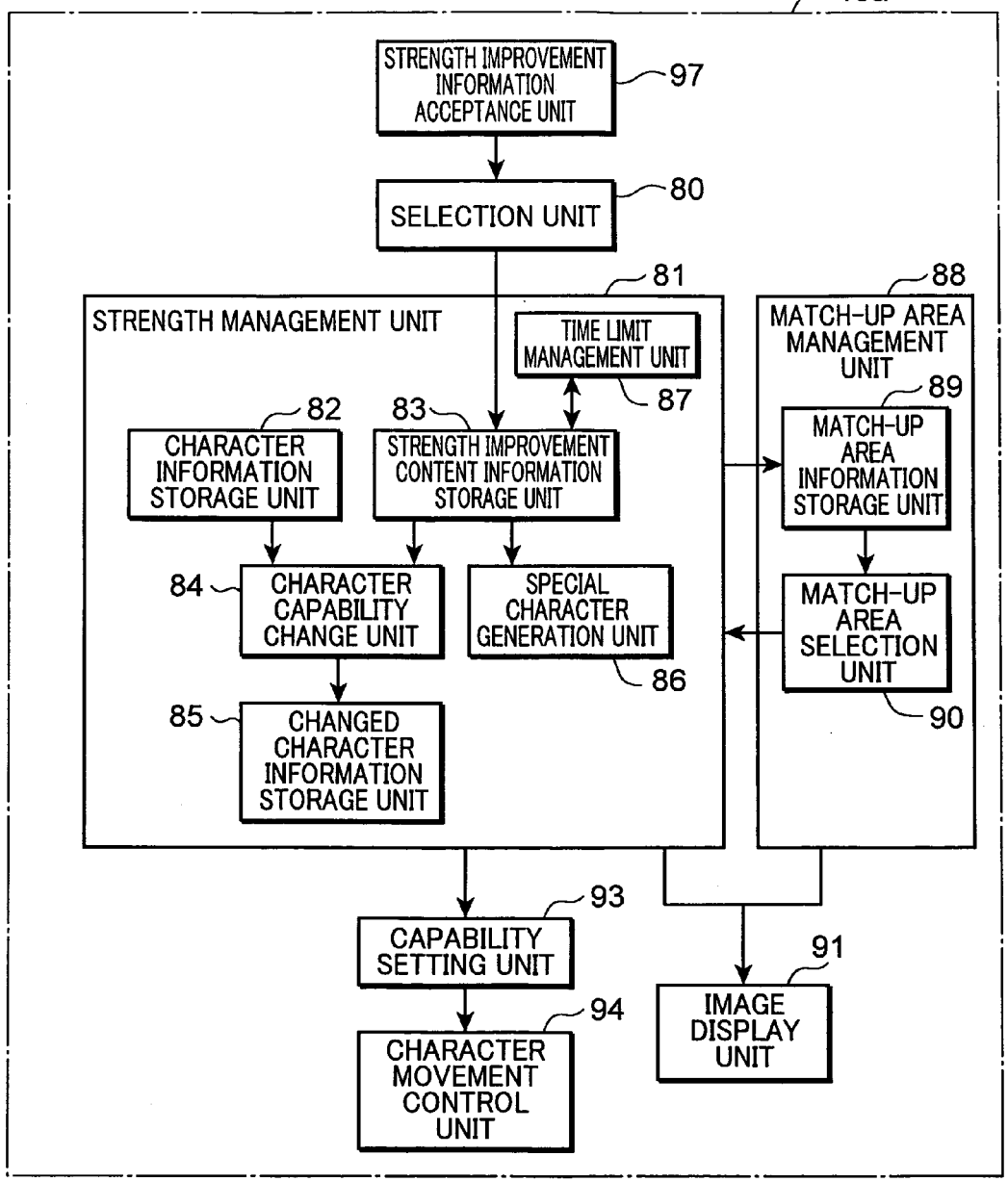
FIG. 13 is a functional block diagram of the terminal device configuring the game system according to an embodiment of the present invention.

As shown in FIG. 13, the terminal device 202 has a configuration where the strength improvement information acceptance unit 97 was added, while the position information acquisition unit 75, the time information acquisition unit 76, the existence fact information input unit 77, the information sending unit 78 and the strength improvement information reception unit 79 were omitted from the configuration elements of the terminal device 102 shown in FIG. 5. The strength improvement information acceptance unit 97 has a function of accepting the strength improvement information that was transferred via the strength improvement information transfer unit 96 of the communication device 203. For example, when the strength improvement information is to be accepted based on infrared communication or communication based on USB connection, the strength improvement information acceptance unit 97 can be configured from an infrared communication means or the like. Moreover, if the strength improvement information is to be accepted via a storage medium such as an SD card, the strength improvement information acceptance unit 97 can be configured from a medium reproduction means such as an SD card reader.

According to the foregoing configuration, the function of sending the current position information, the current time information, and the existence fact information from the ballpark in the real world to the game server 101 and the function of receiving the strength improvement information from the game server 101 are realized in the communication device 203 which is separated from the terminal device 202 that executes the baseball game. Consequently, since the player will only have to bring the communication device 203 and go to the ballpark in the real world, even when the terminal device 202 is relatively large and inconvenient for carrying, the game system 200 of this embodiment can be realized easily.

The game system 300 as a modified example of the game system 200 shown in FIG. 11 to FIG. 13 is now explained with reference to FIG. 14 to FIG. 16. Note that the same reference numeral is given to the configuration that is the same as the configuration shown in FIG. 1 and the like, and the explanation thereof is omitted.

Figure 14:
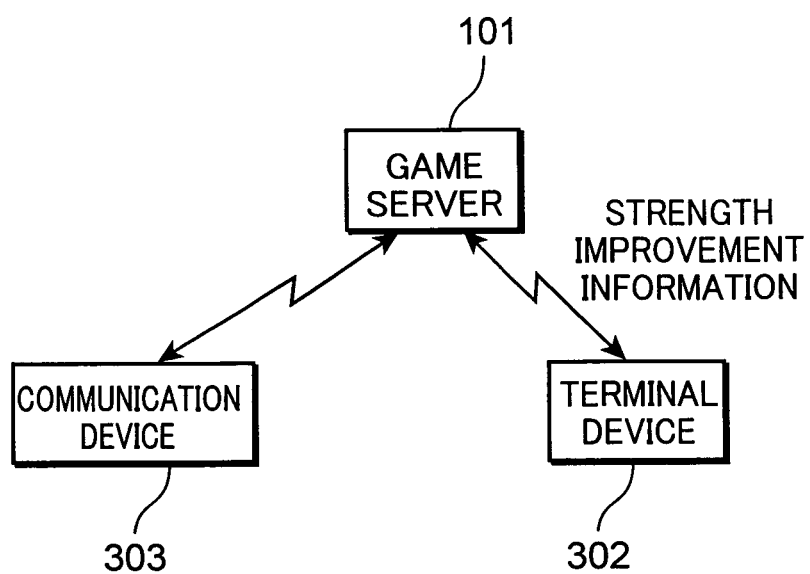
FIG. 14 is an explanatory diagram showing yet another overall configuration example of the game system according to an embodiment of the present invention.

As shown in FIG. 14, the game system 300 comprises a game server 101, a terminal device 302, and a communication device 303 (communication terminal) which is communicably connected to the game server 101.

Figure 15:
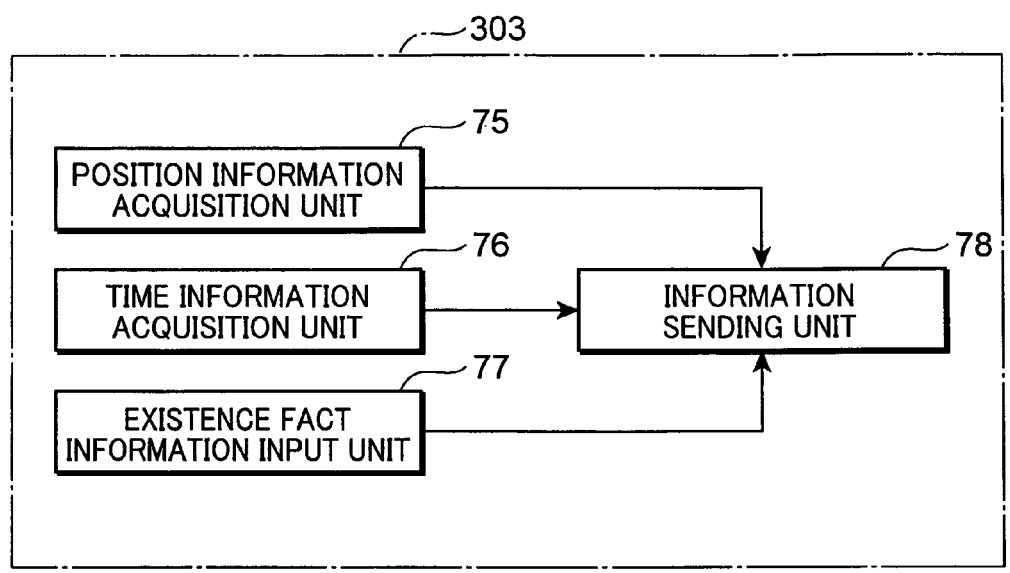
FIG. 15 is a functional block diagram of the communication device configuring the game system according to an embodiment of the present invention.

As shown in FIG. 15, the communication device 303 comprises the previously explained position information acquisition unit 75, time information acquisition unit 76, existence fact information input unit 77 and information sending unit 78. Note that, in the diagram, although the communication device 303 is illustrated as having a configuration of comprising the position information acquisition unit 75, the time information acquisition unit 76 and the existence fact information input unit 77, the configuration may also be such that only the position information acquisition unit 75 and the time information acquisition unit 76 are provided, or the configuration may be such that only the existence fact information input unit 77 is provided.

Figure 16:
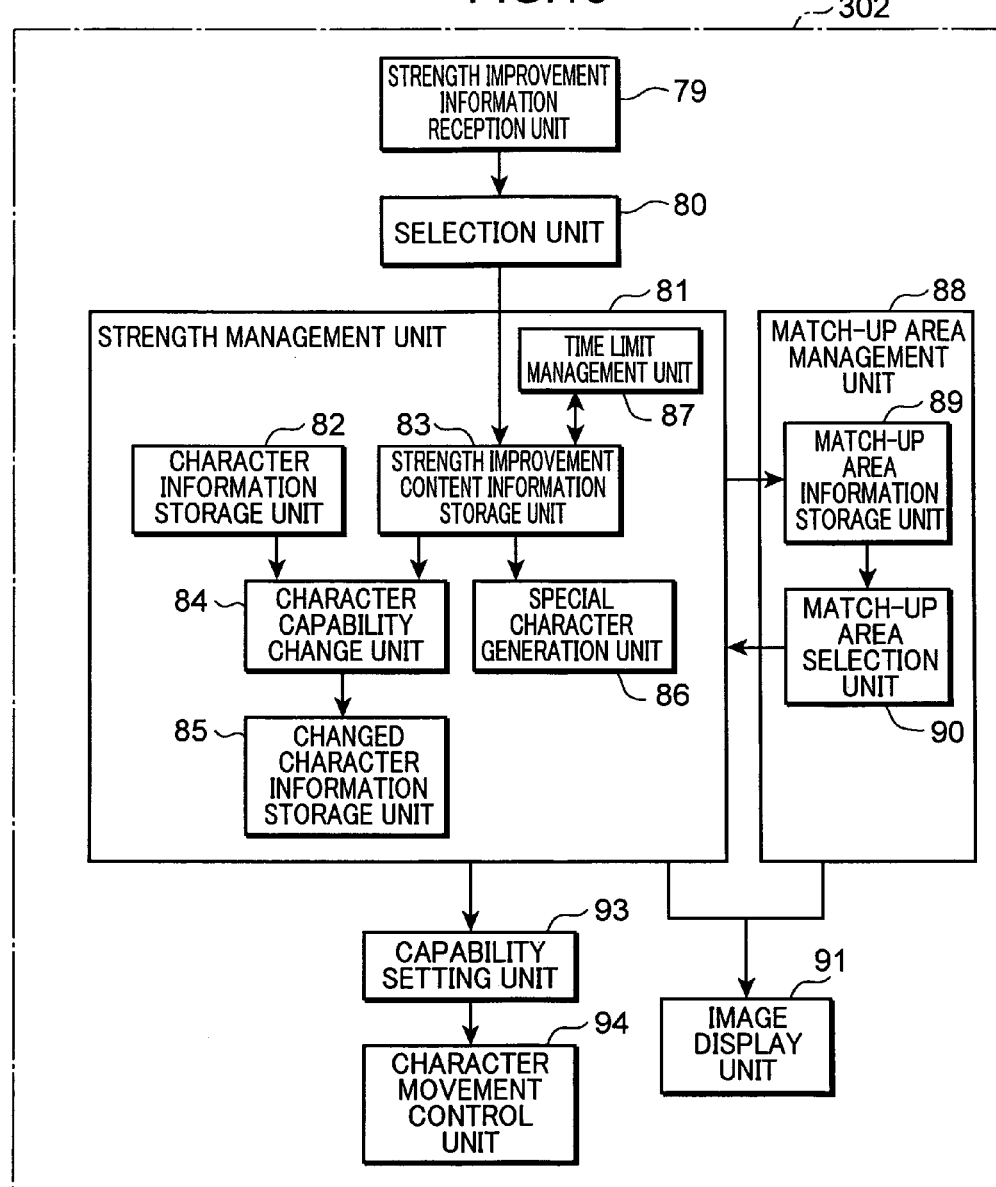
FIG. 16 is a functional block diagram of the terminal device configuring the game system according to an embodiment of the present invention.

Moreover, as shown in FIG. 16, the terminal device 202 has the configuration where the position information acquisition unit 75, the time information acquisition unit 76, the existence fact information input unit 77 and the information sending unit 78 were omitted from the configuration elements of the terminal device 102 shown in FIG. 5.

According to the foregoing configuration, the function of sending the current position information, the current time information, and the existence fact information from the ball park in the real world to the game server 101 is realized in the communication device 303 which was separated from the terminal device 302 that executes the baseball game. Consequently, since the player will only have to bring the communication device 303 and go to the ballpark in the real world, even when the terminal device 302 is relatively large and inconvenient for carrying, the game system 300 of this embodiment can be realized easily.

Note that, in the case of the configuration of the game system 300, the strength improvement information that is distributed from the game server 101 is received by the terminal device 302. Thus, the player will operate the terminal device 302 after returning home, where the terminal device 302 is located, from the ballpark in the real world, log into the game server 101, and thereby receive the strength improvement information.

As described above, the game system 100, 200 or 300 according to this embodiment is a game system including a terminal device 102, 203 or 303 for the player to execute a game by operating the character displayed on the screen, and a management unit which is communicably connected to the terminal device. In addition, the game server 101 as the management unit comprises a player existence determination unit 66 for determining whether the player exists in a predetermined area of a real world corresponding to the in-game match-up area during a predetermined time span, a strength improvement information generation unit 67 for generating strength improvement information which improves the strength when the versus game is to be executed in the in-game match-up area corresponding to the predetermined area when the player existence determination unit 67 determines that the player exists in the predetermined area during the predetermined time span, and a distribution unit 68 for distributing the strength improvement information generated by the strength improvement information generation unit to the terminal device of the player or a communication device capable of transferring the strength improvement information to the terminal device, wherein the terminal device comprises a strength improvement unit for improving the strength based on the strength improvement information when the player is to play the versus game in the in-game match-up area. Here, a predetermined area is a predetermined ballpark in the real world in the case of a baseball game illustrated in this embodiment. A ballpark is an area including the ground as the area where players of the real world play the ballgame, and spectator seating as the area where spectators (including the game player) can watch the ballgame, and the foregoing predetermined area refers to the overall ballpark including the ground and spectator seating.

Note that, with a stadium with an insufficient capacity relative to spectators who wish to enter the stadium, there are cases where a special area is prepared around the stadium for the spectators who were unable to enter stadium so that they can watch the ballgame on a monitor. In the foregoing case, the predetermined area includes the stadium and a predetermined location (foregoing special area and the like) around the stadium.

The game system 100, 200 or 300 of this embodiment is able to further enhance the game element of being able to improve the strength which was conventionally dependent only on the game player's skills of character operation, amount of operation, or operation hours and limited to cases where certain positive results were achieved in the versus game, and enables the improvement of strength by the game player actually visiting a ballpark or stadium in the real world. In other words, the player can enjoy the advantage of being able to improve the strength upon playing a versus game in an in-game match-up area corresponding to the predetermined area in the real world where the player had visited. Thus, a strong link between the real world and the game is created and nonconventional amusement can be offered, and it is thereby possible to provide an unprecedented innovative game element. In addition, the more often the player visits ballpark or stadium in the real world, the strength can be improved, and the chances of winning will increase. Thus, since the player can increase one's chance of winning based on one' own will, a completely novel enjoyment, which was unavailable in the past, can be offered, and it is thereby possible to realize a highly amusing game system.

Moreover, since a time limit is set in the strength improvement, the player can play numerous ballgames with advantageous strength by playing many games within the time limit. Since this will lead to the improvement in the winning percentage, the player will be given the opportunity for the effective cultivation and improvement of the team strength, and achievement of higher class and ranking. Accordingly, in addition enjoying the advantage of improving the strength of the in-game team by visiting a ballpark in the real world, since such advantage is subject to a time limit, the player is motivated to actively play the game within the time limit, and it is possible to realize a game system possessing nonconventional amusement.

Note that, as described above, since the function of the game server 101 can be realized anywhere in the game system 100, 200, 300, it can also be realized as a plurality of functionally-distributed servers. Moreover, it is also possible to cause one or more compact computers in the game system 100 to have a system configuration of possessing a part of all of the functions of the game server 101.

In the game system 100, 200, 300 according to this embodiment, the various computer-readable programs to be executed by the game server 101, the terminal devices 102, 202, 302, and the communication devices 203, 303 are recorded on various computer-readable recording mediums such as a hard disk, optical disk (CD-ROM, DVD-ROM, UMD or the like), flexible disk, semiconductor memory, ROM cassette, cartridge of a domestic video game device, and the like, and executed by being read into the foregoing game server, terminal device, and communication device. Note that the means for providing the various programs to the foregoing game server, terminal device, and communication device is not limited to the foregoing recording mediums, and, for example, it can also be provided via the internet. For example, if a program can be downloaded from a website provided by the company managing the network game via the internet, the configuration may enable the game progress program and the like to be directly downloaded from the foregoing website.

Moreover, in this embodiment, although a baseball game to be played by teams configured from a plurality of characters was taken as an example and explained, it may also be a game of individual matches of independent characters (for example, one-on-one matches of a tennis game or martial arts game).

Moreover, in this embodiment, although the baseball game was mainly explained as an example of the game, and applicable game is not limited thereto, and the present invention can also be applied to various games capable of linking the predetermined area in the real world and the in-game match-up area. For example, the present invention can be similarly applied to games of soccer, tennis, various martial arts, horse racing, car racing and the like.

Moreover, in this embodiment, although the improvement of character capability and use of a special character were explained as an example of strength improvement based on the strength improvement information, the present invention is not limited thereto, and, for example, it may also be another strength improvement mode of acquiring a special offensive or defensive item that can be used in the game. In particular, in a versus game of teams composed of a plurality of characters, the number of characters configuring the team can be increased in order to improve the team strength so as long as the number of team members is not fixed as in a baseball game.

The technical features of the foregoing game system can be summarized as follows.

(1) The foregoing game system is a game system configured from a terminal device for a player to perform a versus game by operating a character in an in-game match-up area displayed on a screen by an image display unit, and a management unit communicably connected to the terminal device, wherein the management unit comprises a player existence determination unit for determining whether the player exists in a predetermined area of a real world corresponding to the in-game match-up area during a predetermined time span, a strength improvement information generation unit for generating strength improvement information which improves the strength of the player when the versus game is to be performed in the in-game match-up area corresponding to the predetermined area when the player existence determination unit determines that the player exists in the predetermined area during the predetermined time span, and a distribution unit for distributing the strength improvement information generated by the strength improvement information generation unit to the terminal device of the player or a communication device capable of transferring the strength improvement information to the terminal device, and wherein the terminal device comprises a strength improvement unit for improving the strength based on the strength improvement information when the player is to play the versus game in the in-game match-up area.

According to the foregoing configuration, the means for improving the strength of the opposing team or character can be diversified, and nonconventional amusement can be offered. In other words, conventionally, the means for improving the strength was dependent on the amount of operation or operation time of player's character operation, or limited to cases where certain positive results (victory or the like) are achieved in the versus game. However, according to the present configuration, the player of the game is given the opportunity to improve the strength of the team or character by actually visiting a predetermined area in the real world. Specifically, for example, in the case of a baseball game, as a result of going to a predetermined ballpark in the real world, the player can enjoy the advantage of being able to improve the strength upon playing a versus game in an in-game match-up area (predetermined area of a virtual world) corresponding to such ballpark.

To explain this in sequence according to the foregoing configuration, the terminal device for the player to execute a versus game by operating a character in an in-game match-up area displayed on a screen comprises a function of improving the strength based on the strength improvement information, and includes a game element of being able to improve the strength. Here, the strength improvement information for improving the strength upon executing the versus game in the in-game match-up area is generated in the management unit and distributed directly to the player's terminal device or distributed to the terminal device via a communication device. The management unit which generates and distributes the strength improvement information comprises a player existence determination unit for determining whether the player exists in a predetermined area in the real world corresponding to the in-game match-up area during a predetermined time span, and the strength improvement information is generated when the player existence determination unit determines that the player exists in the predetermined area during the predetermined time span. Consequently, for example, when the player goes to watch baseball at a predetermined ballpark in the real world (by going to a predetermined area during a predetermined period that the ballgame is being played), the player can receive the distribution of the strength improvement information for improving the strength upon playing a game in the in-game match-up area corresponding to the foregoing ballpark where the player watched the baseball game.

According to the foregoing configuration, the means for improving the strength of the team or character which was conventionally limited in the game can be expanded to the real world. Thus, a strong link between the real world and the game is created and nonconventional amusement can be offered, and it is thereby possible to provide an unprecedented innovative game element. In addition, the more often the player visits a predetermined area (ballpark in the foregoing example) in the real world, the strength can be improved, and the chances of winning will increase. Thus, since the player can increase one's chance of winning based on one' own will, a completely novel enjoyment, which was unavailable in the past, can be offered, and it is thereby possible to realize a highly amusing game system.

(2) In the foregoing configuration, preferably, the strength improvement unit enables the improvement of the strength based on the strength improvement information only during a predetermined period from the time that the strength improvement information has been received from the distribution unit or from the time that the strength has been initially improved based on the strength improvement information.

According to the foregoing configuration, since there is a time limit in the strength improvement, the player is given a sense of tension and motivation. In other words, the player can play numerous ballgames with advantageous strength by playing many games within the time limit. This will lead to the improvement in the winning percentage and efficient improvement of capability of the team and character. For example, in a game system that offers strength improvement based on the cultivation of characters, increases the capability evaluation level (virtual rank, reward, frame, class or the like), or increases the ranking (national ranking or the like) when the player wins in a versus game, if many games are played within the time limit of improving the strength, the cultivation of characters and improvement in the capability evaluation level and ranking can be effectively conducted. Accordingly, in addition enjoying the advantage of improving the strength by visiting a predetermined area in the real world, since such advantage is subject to a time limit, the player is motivated to actively play the game within the time limit, and it is possible to realize a game system possessing nonconventional amusement. Moreover, for game companies providing the game, the player to actively playing the game will broaden the opportunity of gaining profits from time-based or repetition-based billing or profits from the purchase of items and the like, and there is an advantage in that the profitability can be improved.

(3) In the foregoing configuration, preferably, the strength improvement unit limits the number of matches, which enables the improvement of strength based on the strength improvement information, to a predetermined number.

According to the foregoing configuration, even if it is within the valid period of the strength improvement, the effect of strength improvement is lost if the number of matches reaches a predetermined number (for example, ten ballgames). As described above, by setting a valid period and limiting the number of valid matches, the advantage that is obtained by visiting a predetermined area in the real world can be limited to an appropriate range while motivating the player to actively play the game within the time limit.

(4) In the foregoing configuration, preferably, the strength improvement unit comprises a selection unit for causing the player to select a desired strength improvement content from among a plurality of options of different strength improvement contents upon receiving the strength improvement information from the management unit, and the strength is improved based on the strength improvement content that as selected by the selection unit.

According to the foregoing configuration, it is possible to realize a configuration where the player is given the authority to select the content of the strength improvement based on the strength improvement information. Consequently, the player can select the strength improvement content that matches his/her strategy while comparing the plurality of strength improvement contents which are prepared as options. By allowing the player to freely select the strength improvement content as described above, the game element can be deepened and the game amusement can be improved.

(5) In the foregoing configuration, preferably, the versus game is a game that is played by teams configured from a plurality of characters, and the strength improvement unit generates a special character having a predetermined capability value as a character configuring the team based on the strength improvement information.

As an example of strength improvement based on the strength improvement information, although there is a mode of directly improving the strength as a result of improving the capability value of the character, particularly in a team versus game where teams configured from a plurality of characters play against each other, it is also possible to generate a special character having a predetermined capability value as in the foregoing configuration, and allow the player to use such special character as the team member so as to indirectly improve the team capability. In this kind of mode of strength improvement using a special character, the team strength can be effectively improved only with the competence management of the special character without requiring the competence management of improving the capability of each of the plurality of characters configuring the team. Moreover, since the player can also devise a strategy on how to use the generated special character, the game element can be deepened and the game amusement can be improved.

(6) In the foregoing configuration, preferably, the terminal device or the communication device comprises a position information acquisition unit for acquiring current position information, a time information acquisition unit for acquiring current time information, and an information sending unit for sending the current position information and the current time information to the player existence determination unit of the management unit, and the player existence determination unit determines whether the player exists in the predetermined area during the predetermined time span based on the current position information and the current time information received from the terminal device or the communication device.

According to the foregoing configuration, if the player takes the terminal device or the communication device and visits a predetermined area during a predetermined time span, the terminal device or the communication device will acquire the current position information (for example, the latitude and longitude information based on GPS positioning) and the current time information, and sends these to the player existence determination unit of the management unit. Thus, it is possible to realize a configuration where the management unit can easily and accurately determine whether the player exists in the predetermined area during the predetermined time span.

(7) In the foregoing configuration, preferably, the terminal device or the communication device comprises an existence fact information input unit for inputting existence fact information showing the fact that the player exists in the predetermined area during the predetermined time span, and an information sending unit for sending the existence fact information input by the existence fact information input unit to the player existence determination unit of the management unit, and the player existence determination unit determines whether the player exists in the predetermined area during the predetermined time span based on the existence fact information received from the terminal device or the communication device.

According to the foregoing configuration, if the player takes the terminal device or the communication device and visits a predetermined area during a predetermined time span and inputs the existence fact information using the existence fact information input unit of the terminal device or the communication device, such existence fact information is sent from the terminal device or the communication device to the player existence determination unit of the management unit. Here, the existence fact information is information showing the fact that the player existed in the predetermined area during the predetermined time span, and, for example, is image information, barcode information, or character/number/symbol information such as a keyword or password that cannot be imaged, acquired or confirmed unless the player visits the predetermined area in the real world during the predetermined time span. It is thereby possible to realize a configuration where the management unit can easily and accurately determine whether the player exists in the predetermined area during the predetermined time span.

What is claimed is:

1. A game system configured from a terminal device for a game player to perform a versus game by operating a character in an in-game match-up area displayed on a screen by an image display unit, and a management unit communicably connected to the terminal device, wherein the management unit comprises:
a player existence determination unit for determining whether the game player carrying the terminal device exists in a predetermined area of a real world corresponding to the in-game match-up area during a predetermined time span;
a strength improvement information generation unit for generating strength improvement information which improves the strength of the game player when the versus game is to be performed in the in-game match-up area corresponding to the predetermined area when the player existence determination unit has determined that the game player exists in the predetermined area during the predetermined time span; and
a distribution unit for distributing the strength improvement information generated by the strength improvement information generation unit to the terminal device of the game player or a communication device capable of transferring the strength improvement information to the terminal device;
wherein the terminal device comprises:
a strength improvement unit for improving the strength based on the strength improvement information when the game player is to play the versus game in the in-game match-up area;
wherein the predetermined time span is a playing time span of a real-world game that is being performed;
wherein the predetermined area is a real-world match-up area where the real-world game is being played;
wherein the strength improvement information generation unit generates the strength improvement information which improves the strength of the game player when the versus game is to be performed in an in-game match-up area corresponding to the real-world match-up area when the player existence determination unit has determined that the game player exists in the real-world match-up area during the playing time span;
wherein at least one of the terminal device and the communication device comprises:
a position information acquisition unit for acquiring current position information; and
an information sending unit for sending at least the current position information to the player existence determination unit of the management unit;
wherein the management unit comprises:
a storage unit for preliminarily storing time span information showing the playing time span and match-up area information showing the real-world match-up area; and
wherein the player existence determination unit determines whether the game player exists in the real-world match-up area during the playing time span by comparing the information received from the information sending unit with the time span information and the match-up area information.

2. The game system according to claim 1, wherein the strength improvement unit enables the improvement of the strength based on the strength improvement information only during a predetermined period from the time that the strength improvement information has been received from the distribution unit or from the time that the strength has been initially improved based on the strength improvement information.

3. The game system according to claim 2, wherein the strength improvement unit limits the number of matches, which enables the improvement of strength based on the strength improvement information, to a predetermined number.

4. The game system according to claim 1, wherein the strength improvement unit comprises a selection unit for causing the game player to select a desired strength improvement content from among a plurality of options of different strength improvement contents upon receiving the strength improvement information from the management unit, and wherein the strength is improved based on the strength improvement content that as selected by the selection unit.

5. The game system according to claim 1, wherein the versus game is a game that is played by teams configured from a plurality of characters, and the strength improvement unit generates a special character having a predetermined capability value as a character configuring the team based on the strength improvement information.

6. The game system according to claim 1,
wherein said at least one of the terminal device and the communication device further comprises a time information acquisition unit for acquiring current time information,
wherein information sending unit sends the current time information to the player existence determination unit of the management unit, and
wherein the player existence determination unit determines whether the game player exists in the real-world match-up area during the playing time span by comparing the current position information and the current time information received from said at least one of the terminal device and the communication device with the time span information and the match-up area information.

7. A game system configured from a terminal device for a game player to perform a versus game by operating a character in an in-game match-up area displayed on a screen by an image display unit, and a management unit communicably connected to the terminal device,
wherein the management unit comprises:
a player existence determination unit for determining whether the game player carrying the terminal device exists in a predetermined area of a real world corresponding to the in-game match-up area during a predetermined time span;
a strength improvement information generation unit for generating strength improvement information which improves the strength of the game player when the versus game is to be performed in the in-game match-up area corresponding to the predetermined area when the player existence determination unit has determined that the game player exists in the predetermined area during the predetermined time span; and
a distribution unit for distributing the strength improvement information generated by the strength improvement information generation unit to the terminal device of the game player or a communication device capable of transferring the strength improvement information to the terminal device;
wherein the terminal device comprises:
a strength improvement unit for improving the strength based on the strength improvement information when the game player is to play the versus game in the in-game match-up area;
wherein the predetermined time span is a playing time span of a real-world game that is being performed;
wherein the predetermined area is a real-world match-up area where the real-world game is being played;
wherein the strength improvement information generation unit generates the strength improvement information which improves the strength of the game player when the versus game is to be performed in an in-game match-up area corresponding to the real-world match-up area when the player existence determination unit has determined that the game player exists in the real-world match-up area during the playing time span;

wherein at least one of the terminal device and the communication device comprises an existence fact information input unit for inputting existence fact information showing the fact that the game player exists in the predetermined area during the predetermined time span, and an information sending unit for sending the existence fact information input by the existence fact information input unit to the player existence determination unit of the management unit;

wherein the management unit comprises:

a storage unit for preliminarily storing existence fact information for each real-world game that is being played in the real world; and wherein the player existence determination unit determines whether the game player exists in the predetermined area during the predetermined time span by comparing the existence fact information received from said at least one of the terminal device and the communication device with the existence fact information stored in the storage unit.

8. A method of controlling a game system configured from a terminal device for a game player to perform a versus game by operating a character in an in-game match-up area displayed on a screen, and a management unit which is communicably connected to the terminal device, the method comprising:

a player existence determination step in which the management unit determines whether the game player carrying the terminal device exists in a predetermined area of a real world corresponding to the in-game match-up area during a predetermined time span;

a strength improvement information generation step in which the management unit generates strength improvement information which improves the strength of the game player when the versus game is to be performed in the in-game match-up area corresponding to the predetermined area when the player existence determination step determines that the game player exists in the predetermined area during the predetermined time span;

a distribution step in which the management unit distributes the strength improvement information generated in the strength improvement information generation step to the terminal device of the game player or a communication device capable of transferring the strength improvement information to the terminal device; and a strength improvement step in which the terminal device improves the strength based on the strength improvement information when the game player is to play the versus game in the in-game match-up area; and wherein the predetermined time span is a playing time span of a real-world game that is being performed;

wherein the predetermined area is a real-world match-up area where the real-world game is being played;

wherein the strength improvement information generation step generates the strength improvement information which improves the strength of the game player when the versus game is to be performed in an in-game match-up area corresponding to the real-world match-up area, when there is a determination at said player existence determination step that the game player exists in the real-world match-up area during the playing time span;

wherein at least one of the terminal device and the communication device acquires current position information and sends at least the current position information to the management unit;

wherein the management unit comprises:

a storage unit for preliminarily storing time span information showing the playing time span and match-up area information showing the real-world match-up area; and wherein in the player existence determination step, the management unit determines whether the game player exists in the real-world match-up area during the playing time span by comparing the information received from said at least one of the terminal device and the communication device with the time span information and the match-up area information.

9. A non-transitory computer-readable recording medium recorded with a program for causing a computer included in a game system configured from a terminal device for a game player to perform a versus game by operating a character in an in-game match-up area displayed on a screen, and a management unit which is communicably connected to the terminal device to execute:

a player existence determination function of causing the management unit to determine whether the game player carrying the terminal device exists in a predetermined area of a real world corresponding to the in-game match-up area during a predetermined time span;

a strength improvement information generation function of causing the management unit to generate strength improvement information which improves the strength of the game player when the versus game is to be performed in the in-game match-up area corresponding to the predetermined area when the player existence determination function determines that the game player exists in the predetermined area during the predetermined time span;

a distribution function of causing the management unit to distribute the strength improvement information generated by the strength improvement information generation function to the terminal device of the game player or a communication device capable of transferring the strength improvement information to the terminal device; and a strength improvement function of causing the terminal device to improve the strength based on the strength improvement information when the game player is to play the versus game in the in-game match-up area; and wherein the predetermined time span is a playing time span of a real-world game that is being performed;

wherein the predetermined area is a real-world match-up area where the real-world game is being played; and wherein the strength improvement information generation function generates the strength improvement information which improves the strength of the game player when the versus game is to be performed in an in-game match-up area corresponding to the real-world match-up area, when the player existence determination function determines that the game player exists in the real-world match-up area during the playing time span;

wherein at least one of the terminal device and the communication device comprises:

a position information acquisition unit for acquiring current position information; and an information sending unit for sending at least the current position information to the player existence determination unit of the management unit;

wherein the management unit comprises:
a storage unit for preliminarily storing time span information showing the playing time span and match-up area information showing the real-world match-up area; and
wherein the player existence determination unit determines whether the game player exists in the real-world match-up area during the playing time span by comparing the information received from the information sending unit with the time span information and the match-up area information.

* * * * *